(12) United States Patent
Paczan

(10) Patent No.: US 9,671,791 B1
(45) Date of Patent: Jun. 6, 2017

(54) MANAGING UNMANNED VEHICLES

(71) Applicant: Amazon Technologies, Inc., Seattle, WA (US)

(72) Inventor: Nathan Michael Paczan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 20 days.

(21) Appl. No.: 14/735,897

(22) Filed: Jun. 10, 2015

(51) Int. Cl.
| | |
|---|---|
| *G01C 23/00* | (2006.01) |
| *G05D 1/00* | (2006.01) |
| *G05D 3/00* | (2006.01) |
| *G06F 7/00* | (2006.01) |
| *G06F 17/00* | (2006.01) |
| *G05D 1/10* | (2006.01) |
| *G08G 5/04* | (2006.01) |
| *G08G 5/00* | (2006.01) |
| *B64C 39/02* | (2006.01) |

(52) U.S. Cl.
CPC .......... *G05D 1/104* (2013.01); *B64C 39/024* (2013.01); *G05D 1/0088* (2013.01); *G08G 5/0069* (2013.01); *G08G 5/045* (2013.01); *B64C 2201/128* (2013.01); *B64C 2201/141* (2013.01)

(58) Field of Classification Search
CPC ........ G05D 1/104; G05D 1/0088; G05D 1/10; B64C 39/024; B64C 2201/128; B64C 2201/141; G08G 5/0069; G08G 5/045
USPC ............................................................ 701/3
See application file for complete search history.

(56) References Cited

U.S. PATENT DOCUMENTS

| | | | |
|---|---|---|---|
| 2007/0210953 A1* | 9/2007 | Abraham | G08G 5/045 342/29 |
| 2012/0143482 A1* | 6/2012 | Goossen | G08G 5/0034 701/120 |
| 2014/0316616 A1* | 10/2014 | Kugelmass | G05D 1/101 701/8 |
| 2015/0105946 A1* | 4/2015 | Kumar | B64C 39/024 701/3 |
| 2016/0257423 A1* | 9/2016 | Martin | B64F 1/00 |

* cited by examiner

*Primary Examiner* — Calvin Cheung
*Assistant Examiner* — Paula L Schneider
(74) *Attorney, Agent, or Firm* — Kilpatrick Townsend & Stockton LLP

(57) ABSTRACT

Techniques for managing a flow of an unmanned vehicle within a space may be described. In particular, the unmanned vehicle may be determined as being location within the space. The space may be associated with metric that may be based on a plurality of other unmanned vehicles also located within the space. Pairs of location and time data may be computed for the unmanned vehicle. The pairs may represent a path for the unmanned vehicle to use within the space. The pairs of location data and time data computed based on data associated with the unmanned vehicle, data associated with at least one of the other unmanned vehicles, and the metric associated with the space. Once computed, the pairs may be provided to the unmanned vehicle.

20 Claims, 13 Drawing Sheets

MANAGING UNMANNED VEHICLES

BACKGROUND

Unmanned vehicles may be configured for different missions. For example, an unmanned vehicle may receive a location of a mission and perform various operations to complete the mission at the location. In certain situations, the unmanned vehicle may be configured to autonomously perform the operations. In other words, once the mission may have been defined and information about the mission provided to the unmanned vehicle, the unmanned vehicle may not need additional user input to complete the mission.

An unmanned aerial vehicle is an example of an unmanned vehicle. An operator may use the unmanned aerial vehicle to deliver items from a facility to various locations. Some or all of the items may be offered from an electronic marketplace. In response to a user operating a computing device and ordering an item from the electronic marketplace, the unmanned aerial vehicle may be deployed to deliver the item from the facility to a location associated with the user and to, thereafter, return to the facility.

BRIEF DESCRIPTION OF THE DRAWINGS

Various embodiments in accordance with the present disclosure will be described with reference to the drawings, in which.

DETAILED DESCRIPTION

Figure 1:
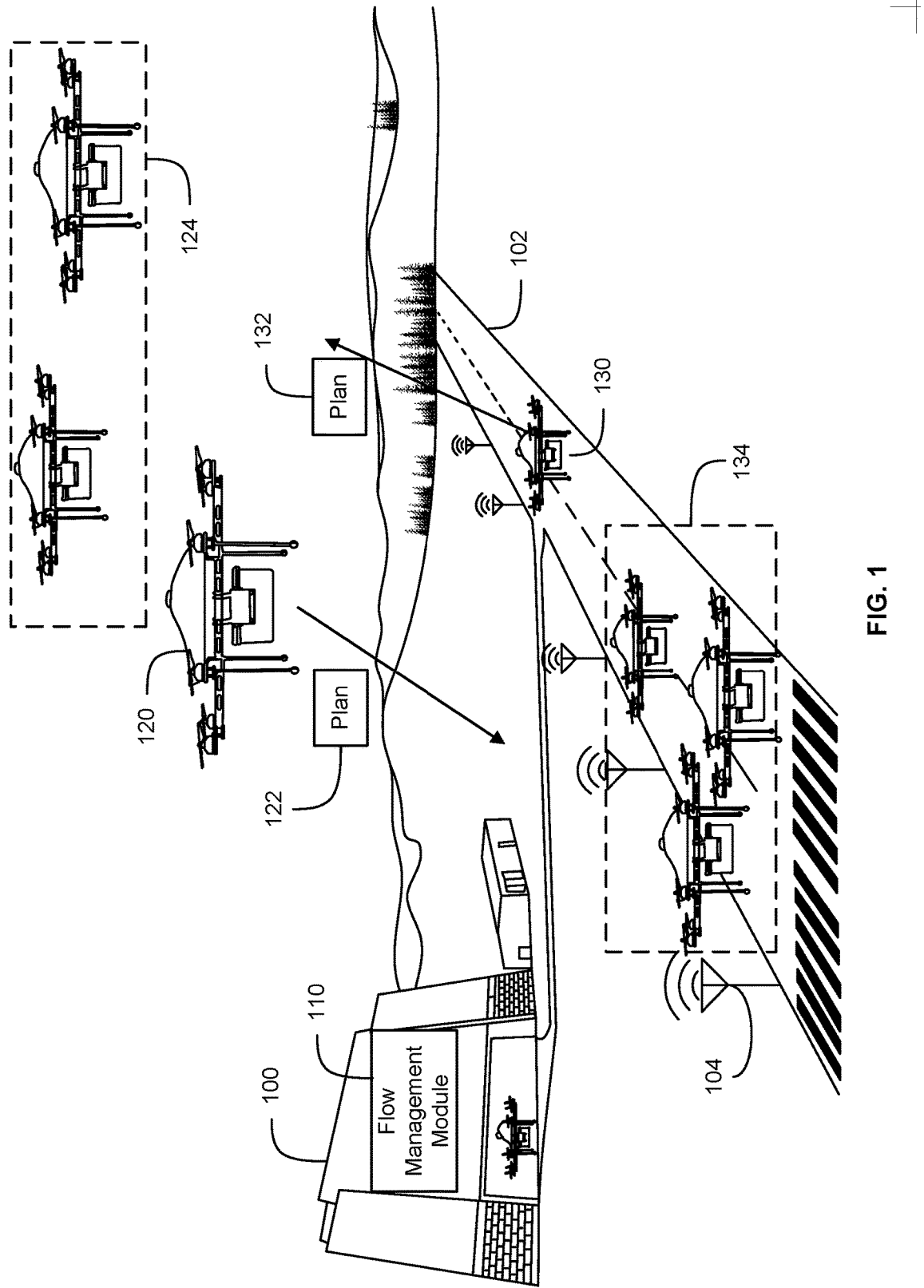
FIG. 1 illustrates an example environment for managing a flow of unmanned vehicles, according to embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, managing a flow of unmanned vehicles within a space. In particular, a large number of unmanned vehicles may concentrate in the space. Each of the unmanned vehicles may be configured to autonomously perform a mission. For example, some of unmanned vehicles may be entering the space. Other unmanned vehicles may be leaving the space. Yet, other unmanned vehicles may be performing certain maneuvers within the space. When the density of the unmanned vehicles in the space increases, managing the flow may become challenging. For example, a higher likelihood of vehicle collision may occur. To manage the flow, a computing system may be configured to determine various data associated with the unmanned vehicles and with the space. Based on this data, the computing system may generate a plan for each unmanned vehicle to autonomously follow while in the space. The overall plan may optimize the flow of the unmanned vehicles within the space. For example, the computing system may detect locations of the unmanned vehicles, identify the respective missions, and determine environmental conditions of the space. Accordingly, the computing system may define a trajectory within the space for each unmanned vehicle. A trajectory may specify locations and respective times to be at the locations. As such, the computing system may schedule how and when each unmanned vehicle may use a portion of the space. Collectively, the trajectories may optimize the flow by allowing one or more of: increasing a throughput of the unmanned vehicles through the space, reducing energy usage of the unmanned vehicles while in the space, reducing distances separating the unmanned vehicles within the space, reducing time spent by the unmanned vehicles in the space, or reducing likelihood of collisions between the unmanned vehicles in the space.

To illustrate, consider an example of a fulfillment center associated with an electronic marketplace. Unmanned aerial vehicles (UAVs) may be configured to deliver items ordered from the electric marketplace to locations associated with consumers. The UAVs may be deployed to deliver the items from the fulfillment center to the locations. In certain situations, a high density of UAVs may exist in the vicinity of the fulfillment center. For example, some UAVs may be autonomously launching while others may be autonomously arriving. A computing system may be configured to manage a controlled airspace proximate to the fulfillment center. As used herein, the term "controlled airspace" shall mean any airspace, surrounding, contiguous, or otherwise, that is of interest to or is monitored by the computing system. It should be understood that ultimate "control" of any airspace lies with the governmental agency (e.g., the Federal Aviation Administration (FAA) in the United States) having jurisdiction over that airspace and that as used here, "controlled airspace" refers to the ability to direct (i.e., control) the ingress and egress of aircraft to and from a particular location or area. The computing system may monitor the various UAVs to manage the UAV flow within the controlled airspace. For example, the computing system may determine the respective location, operational state (e.g., fuel level, damage, and/or other states), a next schedule job (e.g., a quick turnaround to deliver another item, a schedule maintenance, and/or other jobs), and/or capabilities for each UAV. In addition, the computing system may monitor parameters associated with the controlled airspace, such as current environmental conditions and/or a desired UAV throughput. Based on the monitored data, the computing system may generate trajectories for the UAVs. For example, a UAV may be instructed to move to a queuing area for a certain time and thereafter follow a certain flight path according to a certain schedule to land at or depart from a particular location.

In the interest of clarity of explanation, UAVs may be used herein to describe the various embodiments. However, the embodiments are not limited as such. Instead, the embodiments similarly apply to other types of unmanned vehicle, including, but not limited to, land and water-based vehicles. For example, a computing system may be configured to manage a flow of autonomous or semi-autonomous ground vehicles within a space (e.g., a central station, a road intersection, or other spaces). The computing system may schedule and queue the different ground vehicles (e.g., arriving and departing vehicles) based on monitored data to optimize a parameter associated with the space, such as to increase the throughput of the vehicles to a certain goal.

In also the interest of clarity of explanation, a flow of UAVs arriving to and departing from a facility, such as a fulfillment center, may be used herein to describe the various embodiments. However, the embodiments are not limited as such. Instead, the embodiments similarly apply to other types of maneuvers and flows dependently or independently of a facility. For example, traffic of unmanned vehicles traveling through any space may be managed according to the described techniques.

Turning to FIG. 1, the figure illustrates an example environment for managing a flow of unmanned vehicles. As illustrated, UAVs may aggregate around a facility 100. Each UAV or some of the UAVs may be configured to autonomously launch from the facility 100 on a mission and to autonomously return to the facility 100 based on completion of the mission or on some other trigger (e.g., damage to the UAV). An example mission includes delivering an item from the facility 100 to a location associated with a user.

Typically, a throughput of completed missions may be desired. For example, item orders placed at an electronic marketplace may be fulfilled from the facility 100. A deployment system of the facility 100 may deploy UAVs on delivery missions to fulfill the orders. Fulfilled orders may represent a metric that may be monitored for various reasons, such as for planning purposes. For example, if there is a goal to deliver a certain number of items from the facility per time frame (e.g., one thousand items per hour), the UAV fleet size may be adjusted to meet this goal. The planning may also monitor and consider other metrics that may affect the size or the deployment of the UAV fleet. These metrics may include, for example, the UAV energy usage or consumption, separation distances between the UAVs around the facility 100, UAV operational times, and/or UAV frequency of collisions. The planning may optimize some or all of these metrics. In a way, these metrics may represent optimization parameters that may generally be based on a flow of the UAVs within a space around the facility. For example, the delivery throughput (or equivalently, the UAV throughput) may be maximized or set to exceed a threshold. Similarly, the energy usage, separation distances, operations times, and/or frequency of collisions may be minimized or set to be below various thresholds.

As such, there may be a number of ingress, egress, and queuing UAVs within a space around the facility 100. Typically, the density of the UAVs in the space may be high. For example, the number of the UAVs may be large (e.g., in the hundreds or thousands) and the separation distances between the UAVs may be small (e.g., less than a few feet), which may result in the high density. To meet (e.g., optimize) some or all of the above metrics, the flow (e.g., traffic) of the UAVs within the space may be managed.

In an embodiment, a flow management module 110 may be implemented. For example, this module may be hosted on a management component that may include a number of processors and computer-readable media storing instructions for providing the herein described operations and features of the flow management module 110. The flow management module 110 may be configured to manage the flow of the UAVs within the space to meet the metrics. The flow management module 110 may output a flow plan based on data associated with the UAVs, the space, and/or the facility and based on the metrics.

In an example, a computing system of the facility 100 may host the flow management module 110. In this example, the flow management module 110 may provide a centralized service for managing the flow of the UAVs within the space of the facility 100. In another example, a computing system, remote from the facility 100, may host the flow management module 110. In this example, the flow management module 110 may provide a centralized service for managing the UAV flows within spaces of a plurality of remote facilities. For instance, the flow management module 110 may receive the data and metrics from local computing systems of the facilities over a private or public network(s). In response, the flow management module 110 may provide a respective flow plan to each of the local computing systems.

A flow plan may include individual plans for the UAVs. An individual plan of a UAV may be based on data associated with the UAV, and data associated with other UAVs within a space of a facility, data associated with the facility, and/or metrics (e.g., optimization parameters) of the facility. This plan may include a path (e.g., a flight path) defined in space and time, a priority of the UAV, and/or other information relevant to the flow of the UAV within the space. The path, when followed by the UAV (e.g., flown), may represent a flow in space and time of the UAV. A priority may represent an urgency to follow the path. For example, a high priority may indicate an emergency situation such that the path may need to be followed immediately.

In an example, the path may be expressed as a four dimensional trajectory. This trajectory may be defined by pairs of location data and time data. The location data may represent three dimensional space points. The time data may represent a time dimension. A pair of location data and time data may specify a location (e.g., a three dimensional spatial point) that the UAV may need to be at, or arrive to, by or at a specific time.

To generate a flow plan or an individual plan, data associated with the UAVs may be used. The flow management module 100 may receive the data from a monitoring system. The monitoring system may be deployed around the facility 100, such as at one or more locations 102 of the facility 100. Each of the locations 102 may represent an area where UAVs may land, launch, or go in a queue. The monitoring system may include a number of sensors 104 and a communication system (not illustrated in FIG. 1). The sensors 104 may be configured to detect or measure some or all of the data associated with the UAVs, such as location, speed, orientation, direction, and/or other UAV data. For example, the sensors 104 may include electromagnetic, light, motion, and/or radar sensors and, optionally, processing units configured to process the sensed data. The communication system may be configured to transmit the data from the sensors 104 to the flow management module 110 (e.g., to the computing system hosting the module). For example, the computing system may include various data ports, network nodes, and/or data buses to receive the data.

In another example, the deployment system need not include the sensors 104. Instead, the data may be received directly from the UAVs. In this example, the communication system may provide a local area network. When a UAV is within the space of the facility 100, the UAV may transmit the data over a frequency range and using a data protocol supported by the local area network. In addition to the above data, each UAV may transmit a respective identifier and state information. An identifier of a UAV may include a unique numeric values that may identify the UAV. State information of a UAV may include operational and structural information of the UAV, such as a fuel level of the UAV, damage to a component (e.g., an engine, a structure), and other status data.

Other configurations of the deployment system may also be possible. For example, both sensors 104 and a local area network may be used. In another example, satellite-based communications may be used.

Furthermore, the communication system may also be configured to transmit space and facility-based data to the flow management module 110. The space-based data may include environmental data such as current weather conditions, obstacles that may have moved to a location within the area, (e.g., a large delivery truck), and other data associated with the space. The space-data may be received from different sources. For example, the weather conditions may be received from a network-based resource, such as a weather web site. Data about an obstacle may be received from the sensors 104.

The facility-based data may include any or all of the above metrics, such as a desired throughput of the facility 100. The facility-based data may also include schedules, missions, and capabilities of UAVs. The data may be provided from one or more computing systems of the facility 100. For example, the flow management module 110 may receive data about previous, current, and future scheduled missions of a UAV. This type of data may be used to assign a priority to the UAV. To illustrate, the flow management module 110 may determine that an ingress UAV may be associated with a quick turnaround and may accordingly assign a high priority to the UAV.

As such, the flow management module 110 may receive various types of data from different sources. The flow management module 110 may then generate a plan for each of the UAVs. A UAV may receive a respective plan through the communication system. When received, the UAV may autonomously follow the plan while being within the space. Further, the flow management module 110 may monitor (e.g., by receiving location and time data) whether the UAV may be conforming to or deviating from the plan. If a deviation is detected, the flow management module 110 may generate a new plan based on updated data and provide the new plan to the UAV.

As illustrated in FIG. 1, the flow management module 110 may monitor and instruct various UAVs based on the individual plans. An airborne UAV 120 may be instructed to land in a location 102 based on a plan 122. In comparison, the flow management module 110 may queue other airborne UAVs in an airborne queuing area 124. This may indicate that the UAV 120 may have a higher priority relatively to the other airborne UAVs. Of course, multiple UAVs may be landing at the same time, where each UAV may follow a different path. Similarly, a UAV 130 may be instructed to launch from the location 102 (or from a different location) based on a plan 132. Other UAVs may also be instructed to go in a ground queue 134 before launching. Here also, multiple UAVs may be launching at the same time according to different paths.

Figure 2:
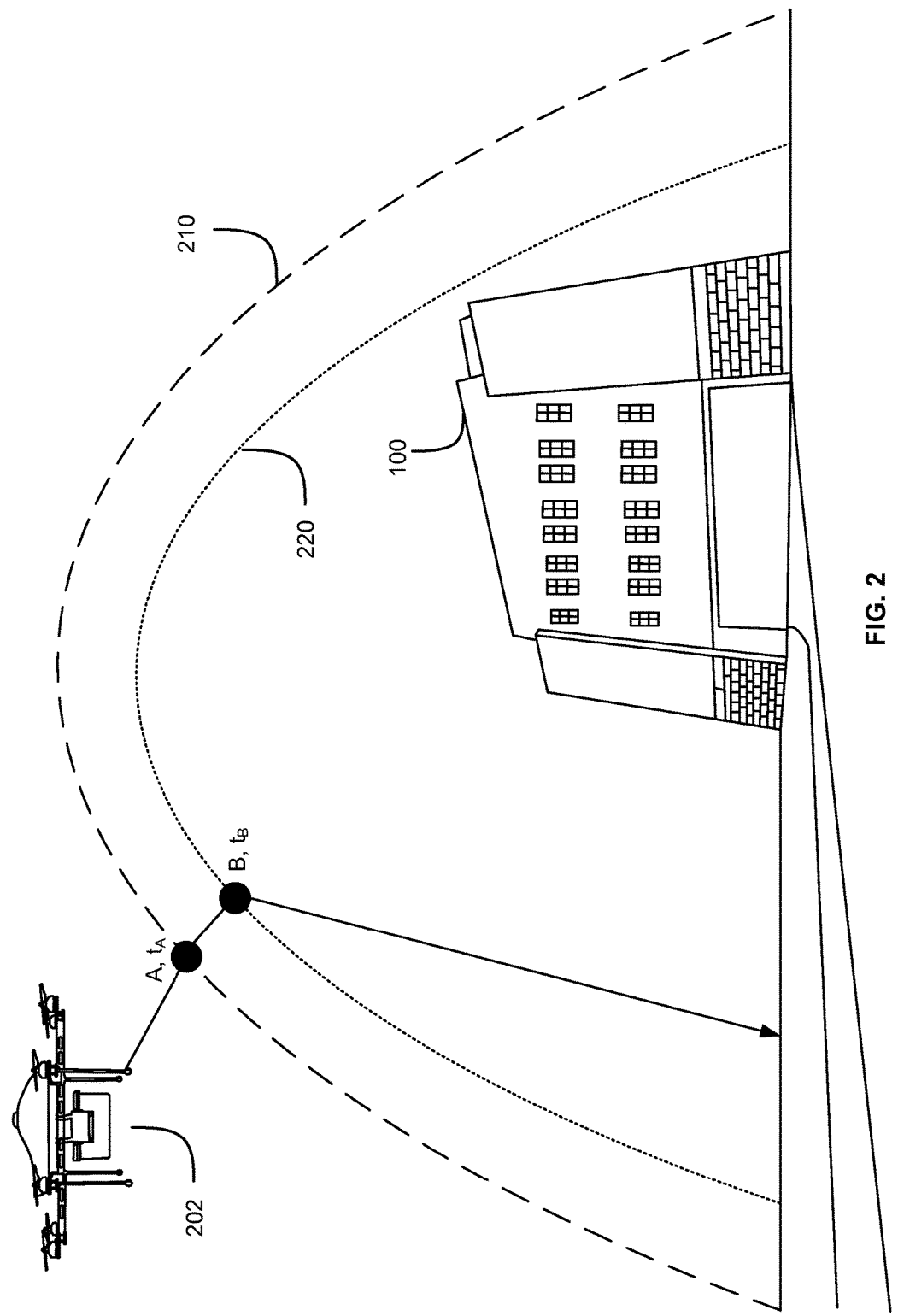
FIG. 2 illustrates an example space around a facility, according to embodiments.

Turning to FIG. 2, the figure illustrates an example space around a facility. The example space may represent a controlled space (e.g., controlled airspace), within which a UAV may be instructed to follow or execute a plan generated by the flow management module 110. The boundaries (e.g., perimeters) of the space may be defined using various or a combination of various techniques.

In one technique, the boundaries may be defined based on the capabilities of the monitoring system described in connection with FIG. 1. For example, an outer perimeter may be a function of a range of the sensors 104 and/or the local area network. In another technique, the boundaries may be defined empirically. For example, historical location and time data associated with UAVs aggregated around the facility 100 may be analyzed to identify high-density spaces. The boundaries may be set based on these high-density spaces (e.g., to at least include the density spaces). In yet another technique, the boundaries may be dynamically defined. For example, the flow management module 110 may receive and analyze current location data of the UAVs to identify UAV densities. If a density (e.g., the number of UAVs within a particular space) exceeds a certain threshold, the flow management module 110 may set boundaries to at least include the particular space. Although FIG. 2 illustrates the space as having spherical-like boundaries, other types of shaped-boundaries may be defined based on the implemented technique.

Further, the space may be defined using more than one boundary. Each boundary may represent a layer or a perimeter and may be defined based on one or more of the above techniques. As illustrated in FIG. 2, a UAV 202 may cross a first boundary 210 (shown at point A and time $t_A$ in FIG. 2) and subsequently a second boundary 220 (shown at point B and time $t_B$ in FIG. 2). When the first boundary is crossed, the UAV 220 may be detected as entering the controlled space by, for example, one or more of the sensors 104 or based on the UAV 202 connecting to the local area network of the communication system. That crossing may trigger an individual plan to be generated and provided to the UAV 202. When the second boundary is crossed, the UAV 202 may be instructed to follow the provided plan (e.g., the UAV 202 may start a landing approach after crossing point B according to a four dimensional trajectory).

Figure 3:
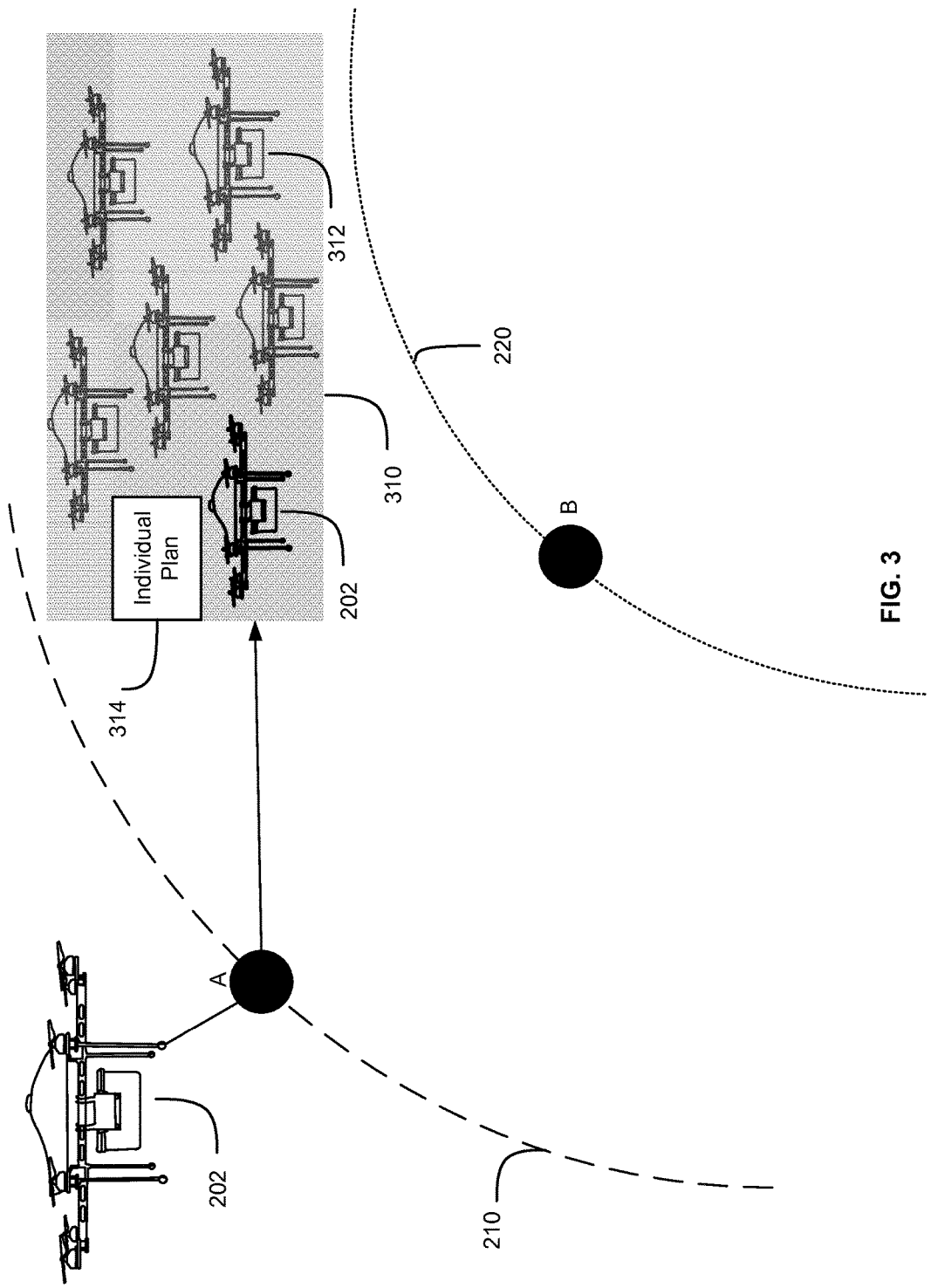
FIG. 3 illustrates an example queuing area within a space around a facility, according to embodiments.
Figure 4:
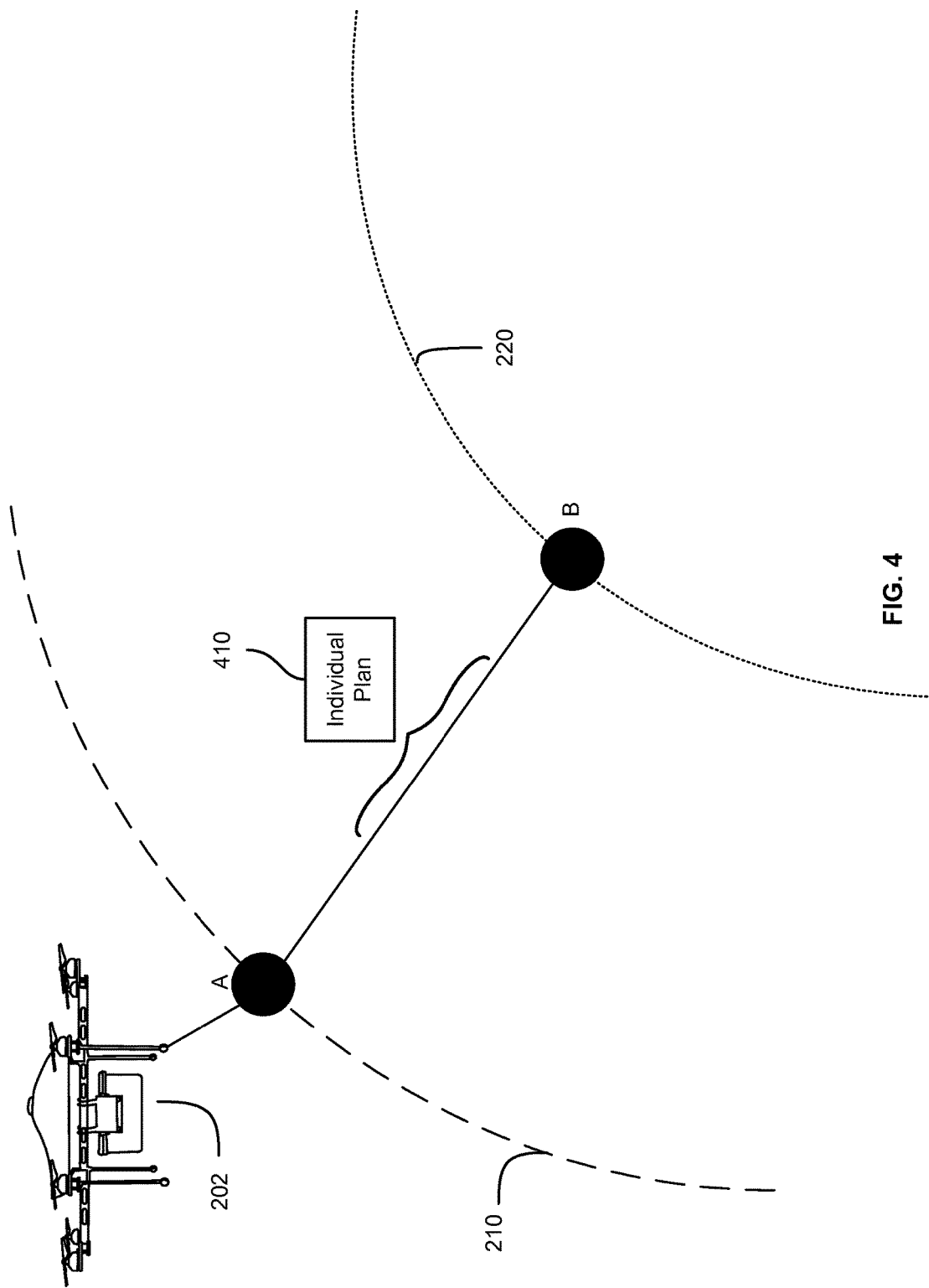
FIG. 4 illustrates an example space that may not use a queuing area, according to embodiments.

As such, between the first boundary 210 and the sound boundary 220, the UAV 202 may be in a waiting state to receive the individual plan. In particular, generating and providing the individual plan may use a certain amount of time. That amount may depend on the UAV traffic within the controlled space (e.g., the number of UAVs) and/or the available computing resources configured to generate individual plans. While in this waiting state, the UAV 202 may be pre-configured to perform particular actions. For example, the UAV 202 may move to and/or stay at a particular location (e.g., point A, point B, between the two points, or a queuing area). FIG. 3 illustrates an example of moving to a queuing area. In another example, the UAV 202 may continue following a pre-configured plan until receiving the individual plan. The pre-configured plan may include a pre-configured flight path to return to the facility 100 based on a pre-configured speed. When the individual plan is received, the UAV 202 may replace the pre-configured plan with the individual plan to land at a location of the facility 100. FIG. 4 illustrates an example of following the pre-configured plan until receiving the individual plan.

Turning to FIG. 3, that figure illustrates using a queuing area 310 in association with a space of a facility (e.g., the controlled space described in connection with FIG. 2). In particular, the UAV 202 may move to the queuing area 310. This move may be based on crossing the first boundary 210. For example, the UAV 202 may be pre-configured to move to the queuing area 310 as soon as crossing the first boundary 210 and until receipt of the individual plan. In another example, the UAV 202 may be instructed by, for example, the flow management module 110 to move to the queuing area as soon as detecting that the UAV 202 may have crossed the first boundary 210.

The move may also or alternatively be based on other parameters. For example, the individual plan itself may instruct the UAV 202 to move to and wait in the queuing area 310 for some time before crossing the second boundary 220. In this example, the second boundary 220 may be defined as an edge of the queuing area 310.

Once in the queuing area 310, the UAV 202 may be queued with a number of other UAVs 312. In an example, each queued UAV may be assigned a priority or an order to leave the queuing area 310. In another example, each queued UAV may leave the queuing area based on a respective individual plan. As illustrated in FIG. 3, an individual plan 314 of the UAV 202 may define time and location data for the UAV 202 to leave the queuing area and/or cross the second boundary 220.

Using queuing areas may enable various operations of the flow management module 110. For example, multiple queuing areas may be defined at various locations in the space. Some of the queuing areas may be located closer to the facility 100. Some of the queuing areas may also be used for queuing UAVs with higher priorities. As such, the flow management module 110 may maintain states of the queuing areas (e.g., the number of queued UAVs, priorities of the UAVs, planned departures, and/or arrivals of queued UAVs from or to a queuing area, and/or other state information). The flow management module 110 may then distribute the UAVs among the queuing areas based on the state information. For example, the flow management module 110 may maintain a balanced distribution of the UAVs. In another example, the flow management module 110 may assign a high priority UAV (e.g., one with a short turnaround) to a high priority queuing area (e.g., a queuing area that may be closest to the facility 100 and that may queue the least amount of UAVs).

Alternatively or additionally to using one or more queuing areas, a direct approach may be implemented. FIG. 4 illustrates an example of the direct approach. In the illustrate example, the UAV 202 may cross the first boundary 210, continue or alter a pre-configured plan until receipt of an individual plan, and thereafter follow the received individual plan.

In particular, prior to crossing the first boundary 210, the UAV 202 may be following a pre-configured plan. The pre-configured plan may define a flight path to return to a location of the facility 100. In an example, the pre-configured plan may also define an action to perform once the first boundary 210 is crossed. For instance, the action may be to alter speed, change direction, and/or orientation, perform a certain maneuver, or continue as is. In another example, rather than the pre-configured plan defining the action, the flow management module 110 may instruct the UAV 202 to alter the pre-configured plan and perform the action upon detecting that the UAV 202 crossed the first boundary 210.

Before crossing the second boundary, the UAV 202 may receive an individual plan 410. This individual plan 410 may be generated by the flow management module 410. Upon receipt, the UAV 202 may start following the individual plan 410 to return to a location of the facility 100. In an example, the individual plan 410 may define when and where to cross the second boundary 220 (e.g., time $t_B$ and point B). In another example, the second boundary 220 may be dynamically defined based on the location where the UAV 202 may start following the individual plan 410.

Hence, by defining one or more boundaries of a space associated with a facility, a controlled space may be defined. Operations of UAVs within the controlled space may be controlled and managed by, for example, the flow management module 110. Although FIGS. 2-4 describe a controlled space in connection with UAVs entering the controlled space, the embodied techniques are not limited as such. Instead, the embodied techniques may similarly apply to UAVs leaving the controlled space and/or performing other maneuvers within the controlled space.

Figure 5:
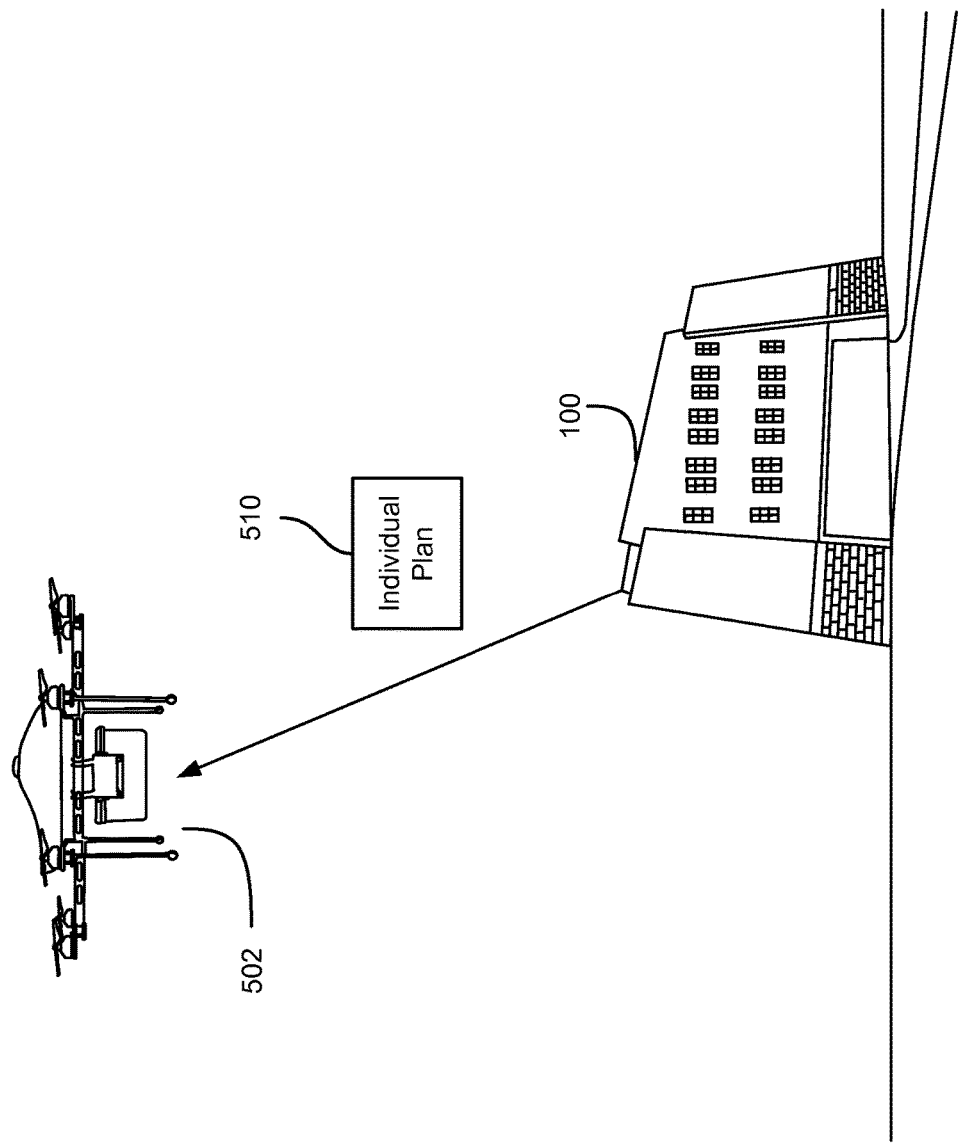
FIG. 5 illustrates an example of unmanned vehicles arriving to or departing from a facility, according to embodiments.

As described herein above, a UAV may follow an individual plan to arrive to or depart from a location associated with a facility and/or to perform a particular maneuver in a space associated with the facility. The individual plan may be provided to the UAV using different techniques. FIG. 5 illustrates an example technique. In particular, a UAV 502 may receive an individual plan 510. The individual plan may be generated by the flow management module 110 and transmitted to the UAV 502 via a communication system associated with the facility 100.

Figure 6:
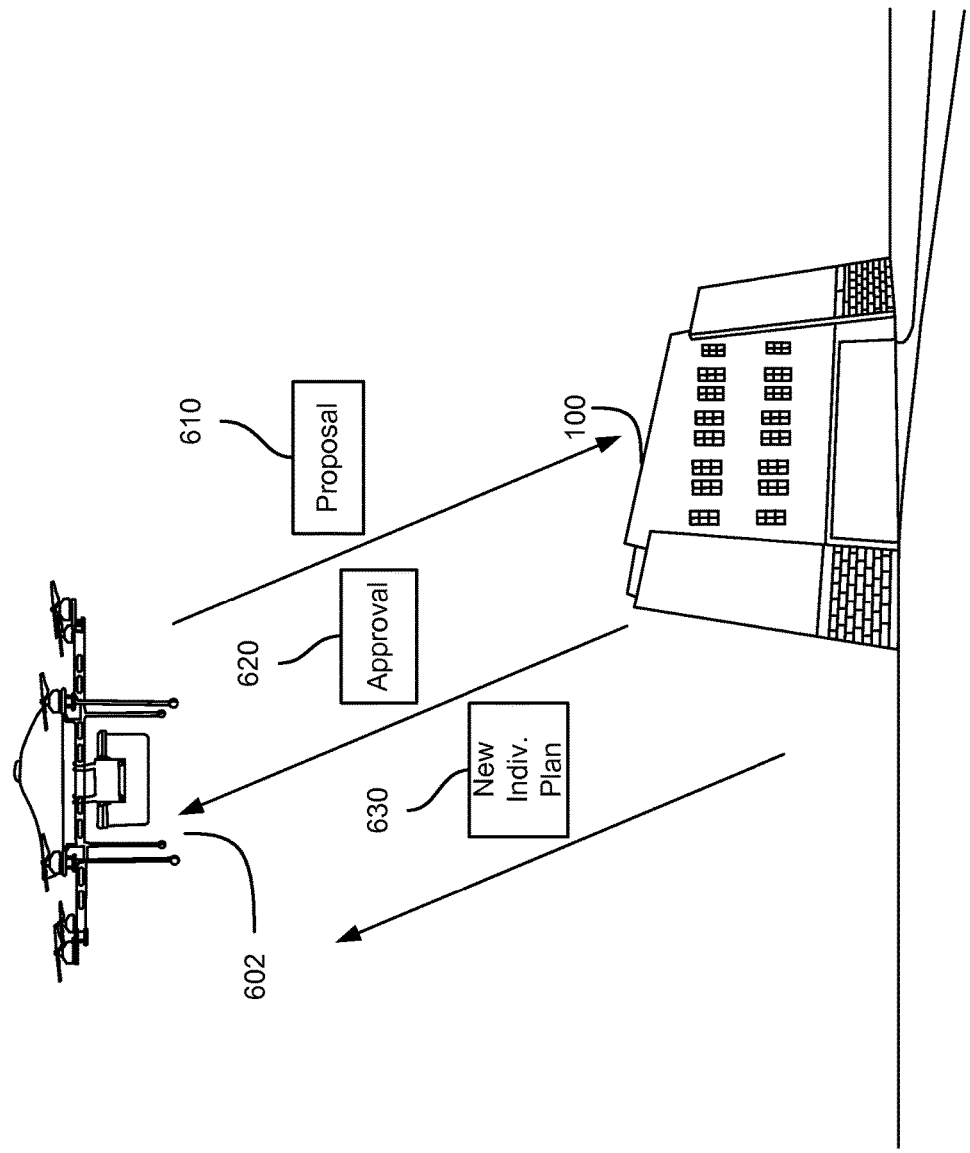
FIG. 6 illustrates another example of unmanned vehicles arriving to or departing from a facility, according to embodiments.

FIG. 6 illustrates another example technique. In this example, a UAV 602 may transmit a proposal 610 to the flow management module 110 over the communication system. The proposal 610 may include an individual plan. Upon receipt, the flow management module 110 may evaluate the proposal 610 and transmit an approval 620 or a new individual plan 630.

In an example, the UAV 602 may automatically transmit the proposal upon entering the controlled space (e.g., crossing the first boundary 210). In another example, the UAV 602 may transmit the proposal 610 upon receiving a request thereto from the flow management module 110.

Various techniques may be used to generate the proposal 610. In one example, a pre-configured plan based on a mission of the UAV 602 (e.g., departing from the facility 100 to a user location to deliver an item and returning to the facility 100) may include the proposed individual plan. In another example, the UAV 602 may be configured to monitor and sense different data based on capabilities of the UAV 602 (e.g., available sensors and processing units installed at the UAV 602). This data may relate to the UAV 602 such as the UAV location and inertial data. This data may also relate to the facility, the controlled space, and/or other UAVs in the controlled space. For example, the data may include available locations of the facility 100, environmental data, location of other UAVs in the vicinity of the UAV 602, inertial data of the other UAVs, separation distances to the other UAVs, and/or other data. The UAV 602 may detect the data upon entry in the controlled space and may use the detected data to generate the proposed individual plan. For example, the proposed individual plan may represent the shortest and quickest flight path that would allow the UAV 602 to return to an available location of the facility while avoiding collisions with other UAVs and obstacles. In yet another example, the UAV 602 may alter pre-configured plan based on currently sensed data to generate the proposed individual plan.

The approval 620 may include an indication (e.g., instructions) for the UAV 602 to follow the proposed individual plan. In comparison, the new individual plan 630 may include an individual plan or one or more changes to the proposed individual plan. The flow management module 110 may generate the new plan or the changes based on an analysis of various data (e.g., data associated with the UAV 602 and with other UAVs within the controlled space, environmental data, and data associated with the facility 100).

Figure 7:
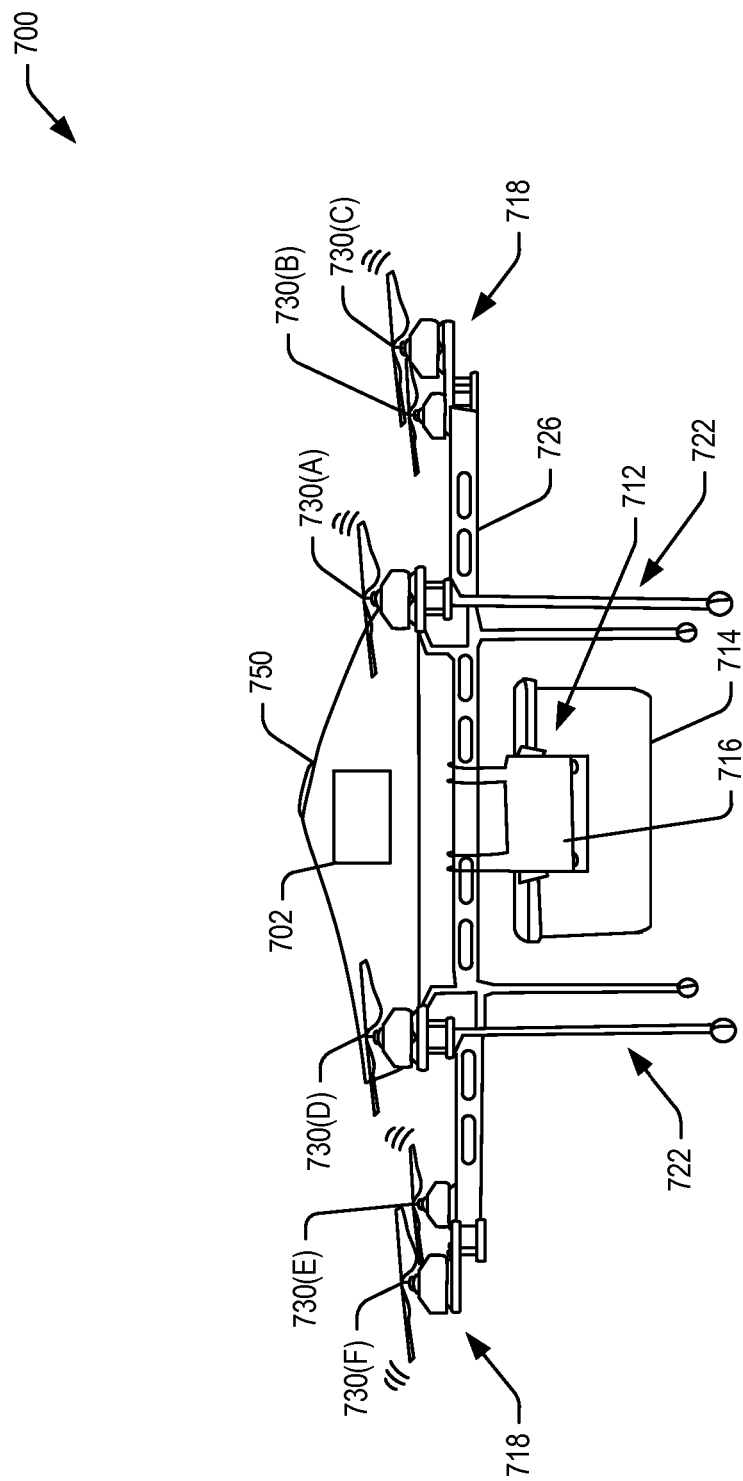
FIG. 7 illustrates an example unmanned vehicle configured to follow a plan, according to embodiments.

Turning next to FIG. 7, an example UAV 700 configured to follow an individual plan generated or approved by the flow management module 110 is illustrated. The UAV 700 may be designed in accordance with commercial aviation standards and may include multiple redundancies to ensure reliability. In particular, the UAV 700 may include a plurality of systems or subsystems operating under the control of, or at least partly under the control of, a management system 702. The management system 702 may include an onboard computer hosting a management module for autonomously or semi-autonomously controlling and managing various operations of the UAV 700 and, in some examples, for enabling remote control by a pilot. In an example, the onboard computer may be configured to receive data from a ground computing system, such as one implementing a flow management module. The received data may include an individual plan and may be used by the management module to control and manage the various operations. In another example, the onboard computer may be configured to receive data from other components of the UAV 700 and to provide some or all of this data to the ground computing system and/or to the management module. The management module may generate and negotiate a proposed individual plan with the flow management module of the ground computing system.

In addition, the various operations controlled and managed by the management system (e.g., the hosted management module) may include managing other components of the UAV 700, such as a propulsion system 718 to facilitate flights. Portions of the management system 702, including the onboard computer, may be housed under top cover 750. In an example, the management system 702 may include a power supply and assemblies (e.g., rechargeable battery, liquid fuel, and other power supplies) (not shown), one or more communications links and antennas (e.g., modem, radio, network, cellular, satellite, and other links for receiving and/or transmitting information) (not shown), one or more navigation devices and antennas (e.g., global positioning system (GPS), inertial navigation system (INS), range finder, Radio Detection And Ranging (RADAR), and other systems to aid in navigating the UAV 700 and detecting objects) (not shown), and radio-frequency identification (RFID) capability (not shown).

As shown in FIG. 7, the UAV 700 may also include a retaining system 712. The retaining system 712 may be configured to retain payload 714. In some examples, the retaining system 712 may retain the payload 714 using friction, vacuum suction, opposing arms, magnets, and other retaining methods. As illustrated in FIG. 7, the retaining system 712 may include two opposing arms 716 (only one is illustrated) configured to retain the payload 714. In an example, the payload 714 may include a data storage device of a user. The management system 702 may be configured to control at least a portion of the retaining system 712. In some examples, the retaining system 712 may be configured to release the payload 714 in one of a variety of ways. For example, the retaining system 712 (or other system of the UAV 700) may be configured to release the payload 714 with a winch and spool system, by the retaining system 712 releasing the payload, by fully landing on the ground and releasing the retaining system 712, and other methods of releasing the payload 714. In some examples, the retaining system 712 may operate semi-autonomously or autonomously.

Further, the UAV 700 may include a propulsion system 718. In some examples, the propulsion system 718 may include rotary blades or otherwise be a propeller-based system. As illustrated in FIG. 7, the propulsion system 718 may include a plurality of propulsion devices, a few of which, 730(A)-230(F), are shown in this view. Each propeller device may include one propeller, a motor, wiring, a balance system, a control mechanism, and other features to enable flight. In some examples, the propulsion system 718 may operate at least partially under the control of the management system 702. In some examples, the propulsion system 718 may be configured to adjust itself without receiving instructions from the management system 702. Thus, the propulsion system 718 may operate semi-autonomously or autonomously.

The UAV 700 may also include landing structure 722. The landing structure 722 may be adequately rigid to support the UAV 700 and the payload 714. The landing structure 722 may include a plurality of elongated legs that may enable the UAV 700 to land on and take off from a variety of different surfaces. The plurality of systems, subsystems, and structures of the UAV 700 may be connected via frame 726. The frame 726 may be constructed of a rigid material and be capable of receiving via different connections the variety of systems, sub-systems, and structures. For example, the landing structure 722 may be disposed below the frame 726 and, in some examples, may be formed from the same material and/or same piece of material as the frame 726. The propulsion system 718 may be disposed radially around a perimeter of the frame 726 or otherwise distributed around the frame 726. In some examples, the frame 726 may attach or be associated with one or more fixed wings.

Figure 8:
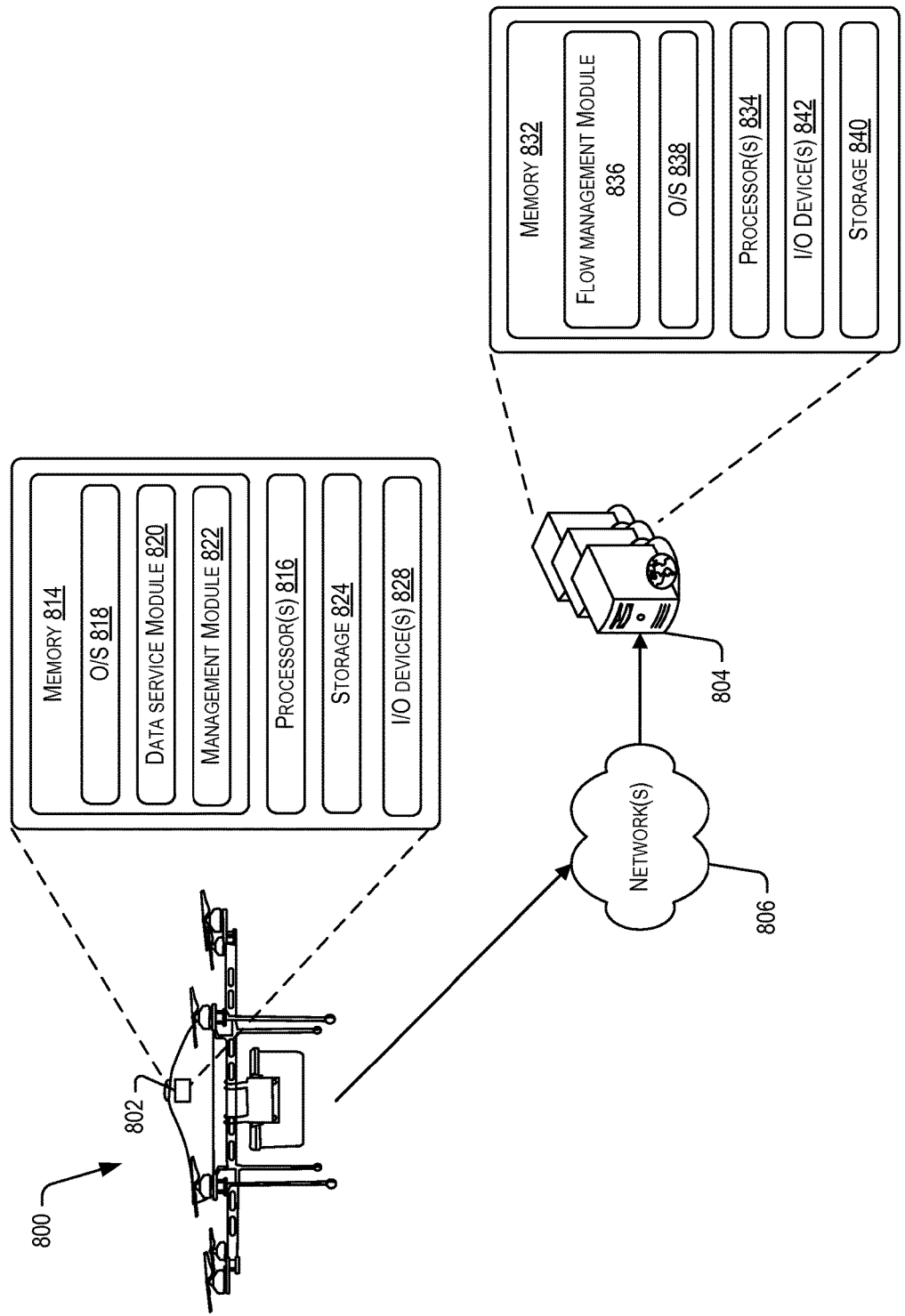
FIG. 8 illustrates computing components of a ground computing system and an unmanned vehicle, according to embodiments.

As described herein above, a computing system associated with a facility may be in communication with a UAV via a communication system. In particular, the computing system may host a flow management module, such as the flow management module 110, to manage a flow of the UAV and other UAVs within a space around the facility. This management may include providing, evaluating, and/or approving an individual plan for the UAV. Conversely, the UAV may host a management module to receive, negotiate, and or follow the individual plan. FIG. 8 illustrates computing components of the computing system and the UAV to facilitate this communication.

In particular, FIG. 8 illustrates examples of a UAV 800, a computing system 804 (e.g., a server), and a network 806. The network 806 may include any one or a combination of many different types of networks, such as wireless networks, cable networks, cellular networks, radio networks, the Internet, and other private and/or public networks. In an example, the network 806 may be implemented by or as part of a communication system between the computing system 804 and the UAV 800.

Turning to the details of the computing system 804, the computing system 804 may include one or more service provider computers, such as servers and other suitable computing devices. some or all of the components of the computing system 804 may be configured to manage a flow of UAVs. In addition, some or all of the components of the computing system 804 may be configured to offer various services to clients. For example, the computing system 804 may be configured to host a website (or combination of websites) viewable to clients. The website may be accessible to the clients via a web browser and may enable the clients to request items (e.g., purchase an item and specify a delivery method). Additionally or alternatively, the requests may be submitted via API calls.

In embodiments, the computing system 804 may be executed by one or more virtual machines implemented in a hosted computing environment. The hosted computing environment may include one or more rapidly provisioned and released network-based resources. Such network-based resources may include computing, networking, and/or storage devices. A hosted computing environment may also be referred to as a cloud computing environment. In some examples, the computing system 804 may include one or more servers, perhaps arranged in a cluster, or as individual servers not associated with one another.

In one illustrative configuration, the computing system 804 may include at least one memory 832 and one or more processing units (or processor(s)) 834. The processor(s) 834 may be implemented as appropriate in hardware, computer-executable instructions, software, firmware, or combinations thereof. Computer-executable instruction, software, or firmware implementations of the processor(s) 834 may include computer-executable or machine-executable instructions written in any suitable programming language to perform the various functions described. The memory 832 may include more than one memory or computer-readable media and may be distributed throughout the computing system 804. The memory 832 may store program instructions (e.g., flow management module 836) that are loadable and executable on the processor(s) 834, as well as data generated during the execution of these programs. Depending on the configuration and type of memory, the memory 832 may be volatile (such as random access memory (RAM)) and/or non-volatile (such as read-only memory (ROM), flash memory, or other memory).

The computing system 804 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 832 may include multiple different types of memory, such as static random access memory (SRAM), dynamic random access memory (DRAM), or ROM.

Turning to the contents of the memory 832 in more detail, the memory 832 may include an operating system 838 and one or more application programs, modules or services for implementing the features disclosed herein including at least the flow management module 836. The flow management module 836, in some examples, may facilitate providing, evaluating, and/or approving individual plans for UAVs. For instance, the flow management module 836 may receive and process data associated with a plurality of UAVs, environmental data of a space associated with a facility, and data associated with the facility to generate and provide one or more individual plans to one or more respective UAVs. In addition, the memory 832 and an additional storage 840 may store information about capabilities of UAVs. Based on an identifier of a UAV, the flow management module 836 may look up and determine the respective capabilities and use this information as part of the respective individual plan.

In some examples, the computing system 804 may also include the additional storage 840, which may include removable storage and/or non-removable storage. The additional storage 840 may include, but is not limited to, magnetic storage, optical disks, and/or tape storage. The disk drives and their associated computer-readable media may provide non-volatile storage of computer-readable instructions, data structures, program modules, and other data for the computing devices.

The memory 832 and the additional storage 840, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. As used herein, modules may refer to programming modules executed by computing systems (e.g., processors). The modules of the computing system 804 may include one or more components. The computing system 804 may also include I/O device(s) and/or ports 842, such as for enabling connection with a keyboard, a mouse, a pen, a voice input device, a touch input device, a display, speakers, a printer, or other I/O device.

Turning to the details of the UAV 800, the UAV 800 may include some or all of the components of the UAV 700 described in connection with FIG. 7. In an illustrative embodiment, the UAV 800 may include a computer system 802 similar to the computing system 704 of FIG. 7. The computer system 802 may include at least one memory 814 and one or more processing units (or processor(s)) 816. The processor(s) 816 may be implemented as appropriate in hardware, computer-executable instructions, software, firmware, or combinations thereof. Computer-executable instruction, software, or firmware implementations of the processor(s) 816 may include computer-executable or machine-executable instructions written in any suitable programming language to perform the various functions described. The memory 814 may include more than one memory and may be distributed throughout the computer system 802. The memory 814 may store program instructions (e.g., a data storage module 820) that are loadable and executable on the processor(s) 816, as well as data generated during the execution of these programs. Depending on the configuration and type of memory, the memory 814 may be volatile (such as random access memory (RAM)) and/or non-volatile (such as read-only memory (ROM), flash memory, or other memory).

The computer system 802 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 814 may include multiple different types of memory, such as static random access memory (SRAM), dynamic random access memory (DRAM), or ROM.

In some examples, the computer system 802 may also include additional storage 824, which may include removable storage and/or non-removable storage. The additional storage 824 may include, but is not limited to, magnetic storage, optical disks, and/or tape storage. The disk drives and their associated computer-readable media may provide non-volatile storage of computer-readable instructions, data structures, program modules, and other data for the computing devices. Data received from the computing system 804 may be stored in the memory 814 and/or the additional storage 824 depending on, for example, the size of the data and the amount of available storage.

The memory 814 and the additional storage 824, both removable and non-removable, are examples of computer-readable storage media. For example, computer-readable storage media may include volatile or non-volatile, removable, or non-removable media implemented in any suitable method or technology for storage of information such as computer-readable instructions, data structures, program modules, or other data. The modules of the computer system 802 may include one or more components.

Turning to the contents of the memory 814 in more detail, the memory 814 may include an operating system 818 and one or more application programs, modules or services for implementing the features disclosed herein including at least a data service module 820 and a management module 822 configured to provide flight operation management functions. In an embodiment, the data service module 820 and the management module 822 may be implemented as one module.

The data service module 820 may be configured to receive, store, and process various data. For example, the data service module 820 may receive data generated from other components of the UAV 800 and related to monitored data related to the UAV (e.g., location and inertial data), other UAVs, a space, and/or a facility. The data service module 820 may be configured to generate an individual plan based on this data. In another example, the data service module 820 may be configured to receive and store an individual plan provided from the computing system 804.

The management module 822 may be configured to manage various operations (e.g., autonomous and semi-autonomous) of the UAV 800 including of other components of the UAV. For example, the management module 822 may access or receive an individual plan from the data service module 820 and direct a propulsion system and other components of the UAV 800 to follow the individual plan by directing the UAV 800 to execute a four dimensional trajectory of the individual plan.

The computer system 802 may also include I/O device(s) 828 (e.g., interfaces, ports) such as for enabling connection with the computing system 804. The I/O device(s) 828 may also enable communication with the other systems of the UAV 800 (e.g., a management system, a propulsion system, and a retaining system).

Figure 9:
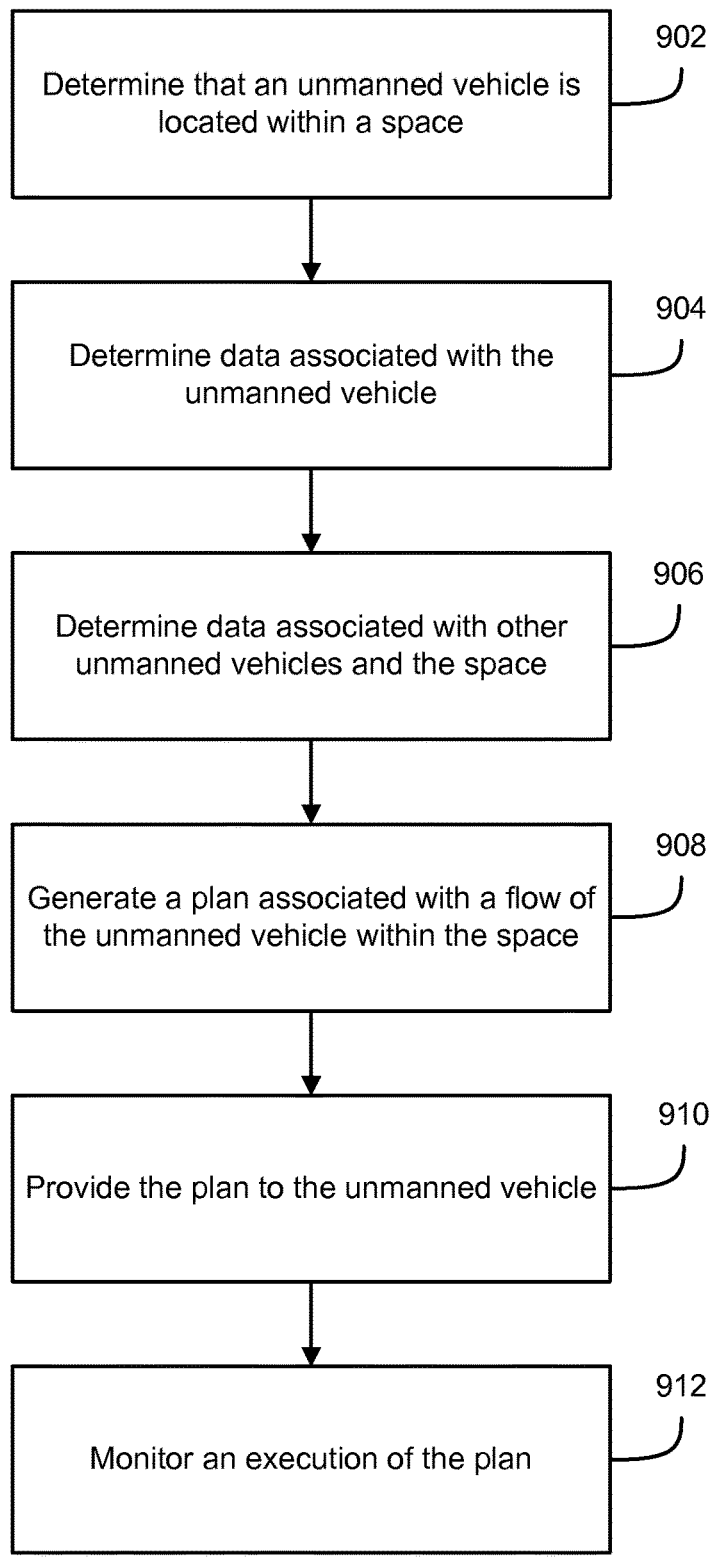
FIG. 9 illustrates an example process for generating and providing an individual plan to an unmanned vehicle, according to embodiments.
Figure 10:
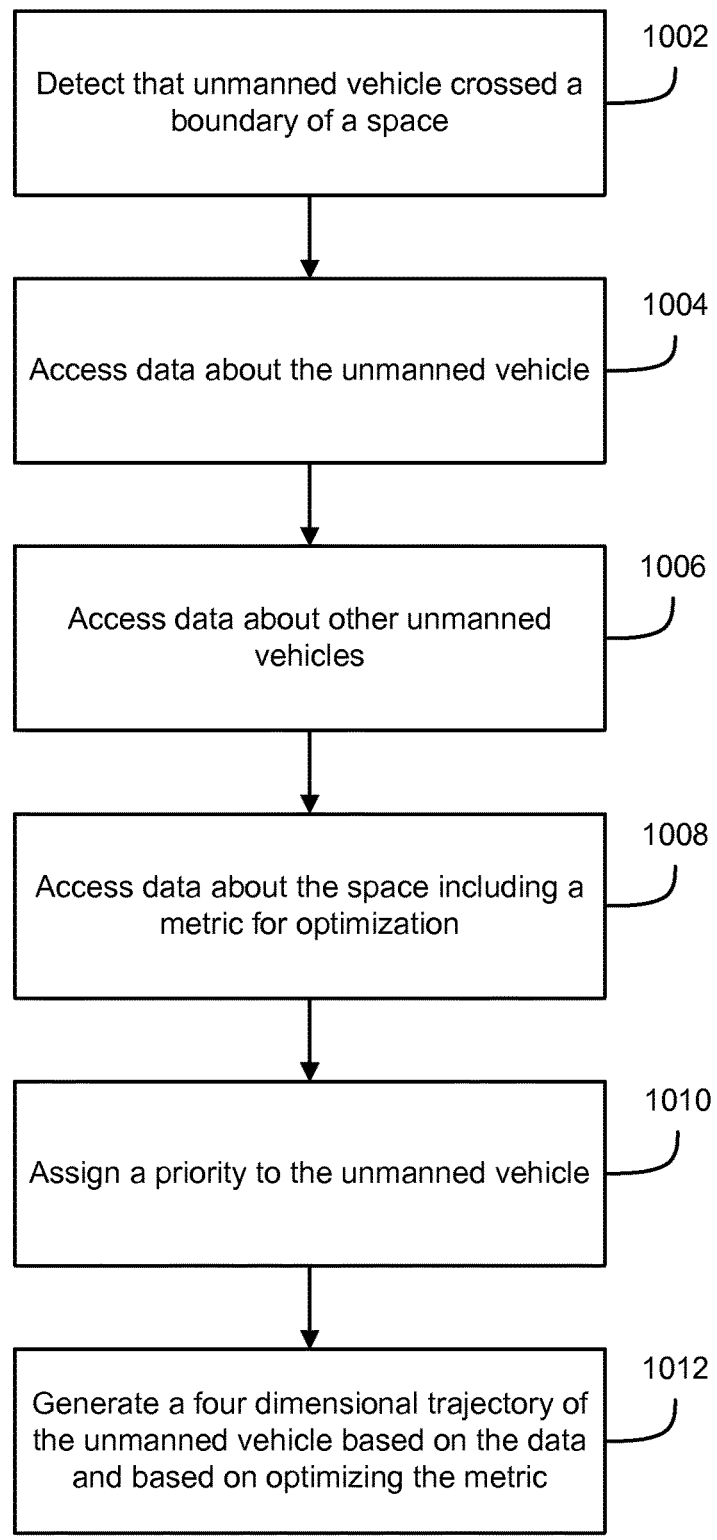
FIG. 10 illustrates an example process for generating an individual plan, according to embodiments.
Figure 11:
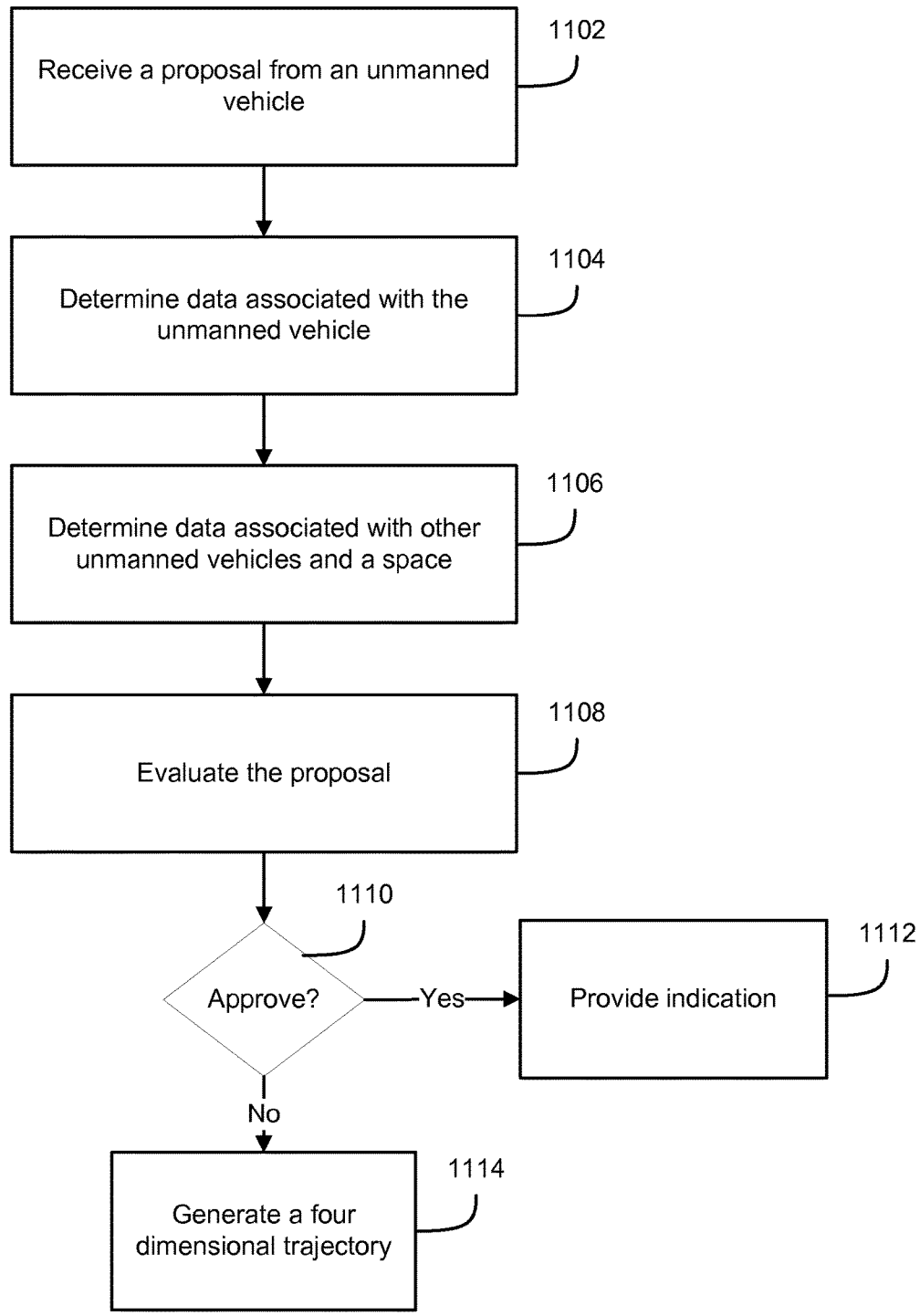
FIG. 11 illustrates an example process for providing an individual plan to an unmanned vehicle, according to embodiments.
Figure 12:
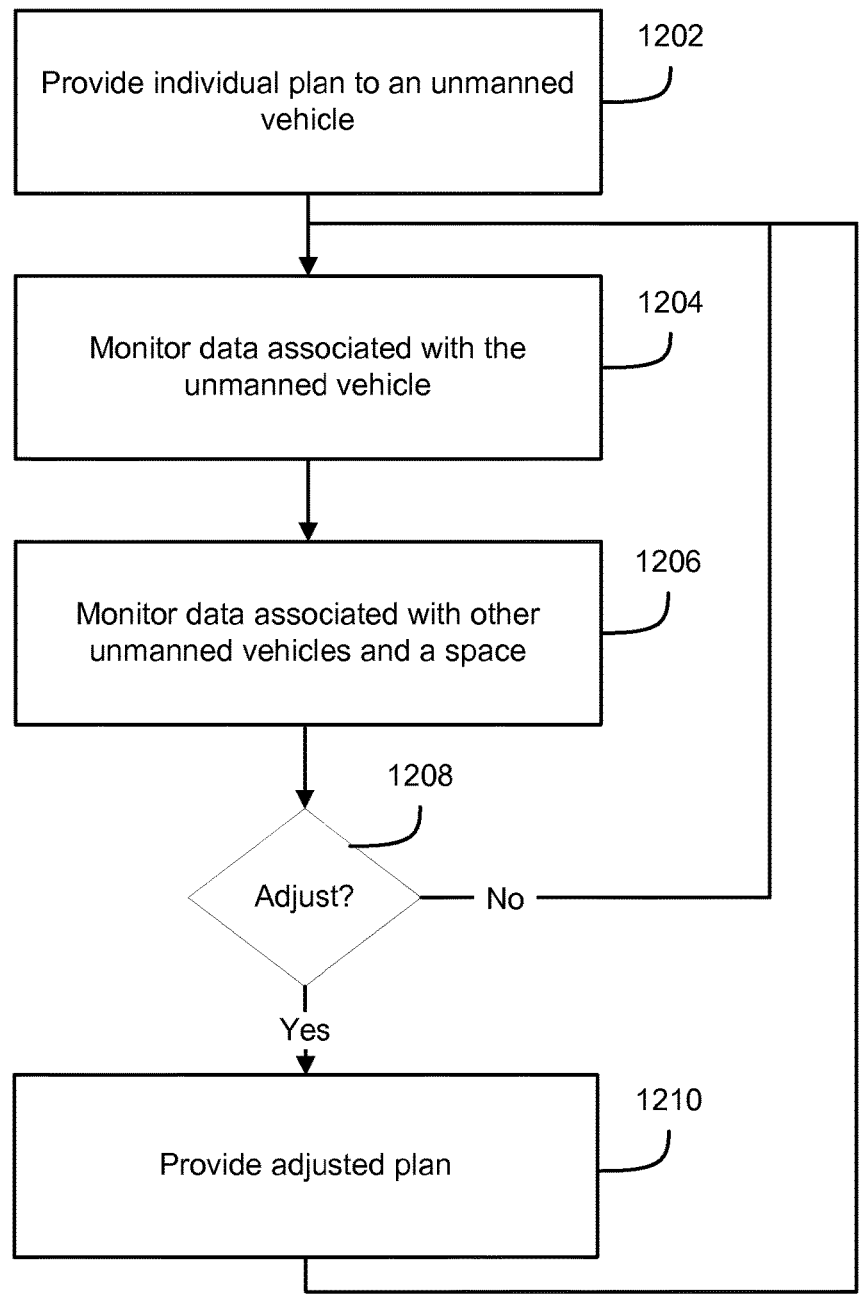
FIG. 12 illustrates an example process for monitoring an execution of an individual plan to determine if an adjustment may be needed, according to embodiments.

Turning to FIGS. 9-12, the figures illustrate example processes for managing a flow of unmanned vehicles configured to operate autonomously (e.g., without user intervention) within a space associated with a facility. FIG. 9 illustrates an example process for generating and providing an individual plan as part of the flow management. In comparison, FIG. 10 illustrates an example process for generating the individual plan. FIG. 11 illustrates an example process for providing the individual plan to the unmanned vehicle. FIG. 12 illustrates an example process for monitoring an execution of the individual plan to determine if an adjustment may be needed. Some of the operations of an example process may be further embodied in operations of other example processes. Thus, some operations may be similar. Such similarities are not repeated herein in the interest of clarity of explanation.

Further, in the illustrative operations, some of the operations or functions may be embodied in, and fully or partially automated by, modules executed by one or more processors. For example, a management module of the unmanned vehicle, such as the management module 822 and/or the data service module 820 described in connection with FIG. 8, and a flow management module of a computing system, such as the flow management module 836 described in connection with FIG. 8, may be configured to perform some or all of the operations. Nevertheless, other or a combination of other computing devices and modules may be additionally or alternatively used. Also, while the operations are illustrated in a particular order, it should be understood that no particular order is necessary and that one or more operations may be omitted, skipped, and/or reordered.

In addition, in the interest of clarity of explanation, the example processes are described in connection with providing an individual plan to an unmanned vehicle, such as a UAV. However, the example processes are not limited as such. Instead, the example processes similarly apply to providing a plurality of individual plans to a plurality of unmanned vehicles of same or different types. While the UAV may be illustrated as arriving to or departing from a controlled space, the example processes also apply to other types of maneuvers. Further, the example processes may similarly be implemented by a computing system that may manage the flow for a plurality of facilities and/or for a plurality of locations of a facility.

The example process of FIG. 9 may start at operation 902, where a flow management module may determine that an unmanned vehicle, such as a UAV, may be located within a space associated with a facility, such as a controlled space. For example, the flow management module may detect that the UAV may have crossed a boundary of the controlled space based on sensors detecting and relaying a location of the UAV or based on receiving location data from the UAV.

At operation 904, the flow management module may determine data associated with the unmanned vehicle. For example, the flow management module may receive location data and inertial data from the sensors or from the UAV. The flow management module may also receive an identifier and state information about the UAV. The identifier may be received from the sensors and/or the UAV. In comparison, the state information may typically be received from the UAV and may include one or more states related to operations and/or structures of components of the UAV. For example, the state information may include a fuel level and/or an indication of damage if one exists. In addition, the flow management module may determine capabilities and mission information of the UAV. This data may be received from other components of a computing system hosting the flow management module. For example, the flow management module may use the UAV identifier to retrieve the capabilities from a data store hosted by or accessible to the computing system. Further, the flow management module may receive schedule information (e.g., a next mission, a scheduled turnaround, a maintenance stop) from a deployment system hosted by or accessible to the computing system.

At operation 906, the flow management module may determine data associated with other unmanned vehicles and data associated the space. The other unmanned vehicles, such as UAVs, may be located within the controlled space or may be about to arrive or leave the controlled space at the time when the UAV crossed the boundary. The type of data and/or the process(es) to determine the data associated with these UAVs may be similar to the data type and the process(es) of the operation 904. In comparison, the data associated with the space may include environmental data related to the controlled space. Such data may be received from the sensors and/or remote sources (e.g., from a web site that provides weather data). In addition, this data may include data associated with the facility, such as available landing and/or launching locations and queuing areas. Facility-related data may also include one or more optimization parameters. For example, an optimization parameter may represent a metric that may be used for optimizing individual plans. Example metrics may include throughput of the UAVs within the controlled space, energy usage, time to land or launch, and/or other metrics.

At operation 908, the flow management module may generate a plan associated with a flow of the unmanned vehicle within the space. For example, the plan may represent an individual plan that may control how and when the UAV may move through the controlled space. In an example, the individual plan may include a four dimensional trajectory that may be followed to land or launch the UAV. The four dimensional trajectory may represent pairs of location data (e.g., three dimensional space data) and time data (e.g., a time point for each three dimensional spatial point). The individual plan for the UAV may be generated based on the data associated with the UAV, the data associated with the other UAVs, the data associated with the space, the data associated with the facility, and one or more optimization parameters.

At operation 910, the plan may be provided to the unmanned vehicle. For example, the flow management module may output the individual plan to a communication system (e.g., one using a local area network) to transmit the individual plan to the UAV. If received, the UAV may transmit back an acknowledgement message. If such a message is not received by the flow management module, the flow management module may retransmit the individual plan. A management module of the UAV may use a successfully received individual plan to control various components of the UAV such that the UAV may execute the plan (e.g., may follow or fly the four dimensional trajectory).

At operation 912, the flow management module may monitor an execution of the individual plan. For example, the flow management module may receive and track location and time data of the UAV within the controlled space for comparison to the four dimensional trajectory. If an unacceptable deviation is detected, the flow management module may update the individual plan for transmission to the UAV.

Hence, by monitoring data related to a plurality of unmanned vehicles, a controlled space, and a facility, individual plans for autonomously landing and/or launching some or all of the unmanned vehicles may be possible. Further, by considering one or more optimization parameters in generating the individual plans, a flow of the unmanned through the controlled space may be optimized. If a change occurs or a deviation is detected, a respective plan may be updated such that the overall flow may be nonetheless maintained and optimized.

Turning to FIG. 10, the figure illustrates another example process for generating the individual plan. In particular, the example flow may start at operation 1002, where a flow management module may detect that an unmanned vehicle, such as a UAV, crossed a boundary of a space associated with a facility, such as a controlled space. For example, sensors of a communication system accessible to the flow management module may detect that the UAV crossed the boundary (e.g., a first boundary 210 as illustrated in connection with FIG. 2). In another example, the detection may be based on the UAV establishing communication with a local network of the communication system by using a frequency and a data protocol of the local area network. Establishing the communication may include transmitting an identifier of the UAV.

At operation 1004, the flow management module may access data about the unmanned vehicle. For example, various types of data about the UAV may be available from different sources. The sources may include the UAV, sensors, communication systems, network nodes, and/or computing systems and/or modules local to or accessible to the flow management module. The accessed data may also depend on the maneuver of the UAV. For example, the accessed data of an arriving UAV may be different from the accessed data of a departing UAV.

At operation 1006, the flow management module may access data about other unmanned vehicles. For example, various types of data about UAVs currently present in the controlled space may be available and accessed from different sources. The accessed data may relate to UAVs performing similar or different maneuvers as the ones of the UAV.

At operation 1008, the flow management module may access data about the space. This data may include also data about the facility and one or more metrics that may be used for optimization. Here again, various types of data may be available and accessed from different sources.

At operation 1010, the flow management module may assign a priority of the unmanned vehicle. The priority may be based on the accessed data about the UAV. For example, information indicating an emergency (e.g., low fuel level, damage), schedule information indicating a short turnaround, or mission information indicating urgency to depart may result in a high priority assignment. In comparison, state information indicating normal operations or schedule information indicating a long turnaround or a scheduled maintenance may result in a low priority assignment.

In addition, a priority may be assigned to the UAV relative to priorities of other UAVs. In this case, the flow management module may use also data about the other UAVs. For example, a short turnaround UAV may be given a higher priority than a long turnaround UAV.

The assigned priorities may be used as a set of variables in generating individual plans. For example, higher priorities UAVs may be given shorter and/or faster four dimensional trajectories or may be allocated to queuing areas that may be less busy or located closer to the facility.

At operation 1012, the flow management module may generate a four dimensional trajectory to be followed by the unmanned vehicle. This trajectory may be generated based on the accessed data and the optimization metric(s). The trajectory may also be generated based on assigned priorities.

In an example, the flow management module may be configured to set the different data and/or priorities as variables in an optimization model and to search for a solution that may optimize the optimization metric(s). For example, the flow management module may determine a solution that may increase throughput of UAVs arriving or leaving the controlled space, reducing energy consumption of the UAVs, reducing time spent by the UAVs in the controlled space, reducing likelihood of collisions between the UAVs in the controlled space, or that may reduce distances separating the UAVs in the controlled space. The solution may be determined for each UAV and may include a corresponding four-dimensional trajectory.

Various techniques may be used to implement the optimization model and search for the solution. In one technique, an objective function may be used. The four dimensional trajectory may represent best available values of the objective function given the data about the plurality of UAVs, the data about the space, the data about the facility, and the optimization metric(s). In another technique, a first come first serve model may be used. In this technique, when a UAV enters (or leaves) the controlled space, a respective four-dimensional trajectory may be generated. This four dimensional trajectory may no longer be updated unless an emergency or a deviation is detected. When a next UAV enters the controlled airspace, a respective four-dimensional trajectory may be also generated. However, this next trajectory may be generated in light of the previous trajectory (e.g., the one of the previous UAV) in a way that may further optimize or maintain an optimization of the optimization metric(s). In yet another technique, an inclusive approach may be used. In this technique, the flow management module may be configured to analyze the data for a plurality or a group of UAVs within the controlled space to concurrently generate respective four-dimensional trajectories according to the optimization parameter(s).

Whereas FIG. 10 illustrates an example process that a flow management module may implement to generate an individual plan, FIG. 11 illustrates an example process to negotiate such a plan with an unmanned (e.g., a management module of a UAV). In particular, the example flow of FIG. 11 may start at operation 1102, where the flow management module may receive a proposal from the unmanned vehicle, such as a UAV. The proposal may include a four dimensional trajectory. In an example, this trajectory may be pre-configured or pre-defined for the UAV prior to the UAV crossing a boundary of a controlled airspace. In another example, the UAV may update this trajectory or may generate one once the boundary may have been crossed based on various data sensed and processed by the UAV.

At operation 1104, the flow management module may determine data associated with the unmanned vehicle. For example, various types of data about the UAV may be accessed from different sources. At operation 1106, the flow management module may determine data associated with a plurality of unmanned vehicles and the space. Here again, various types of data about other UAVs and the controlled space may be accessed from different sources.

At operation 1108, the flow management module may evaluate the proposal. Various techniques may be implemented to perform the evaluation. In one technique, the flow management module may input the proposed trajectory to the optimization model to determine whether the proposed trajectory may be an acceptable solution. In another technique, the flow management module may generate a four dimensional trajectory. The generated trajectory may be compared to the proposed trajectory. If the differences fall within an acceptable margin, the flow management module may determine that the proposed trajectory may be acceptable.

At operation 1110, the flow management module may determine whether to approve the proposal or not. For example, based on the evaluation, the flow management module may accept the proposal. In that case, operation 1112 may be followed to indicate that the proposal is accepted. For example, the indication may include an authorization to follow the proposed trajectory. However, if the evaluation indicates an unacceptable proposal, the flow management module may deny the proposal. In that case, operation 1114 may be performed. At operation 1114, the flow management module may generate and provide a four dimensional trajectory to the UAV or may provide changes to the proposed trajectory. In an example of generating a new trajectory, the flow management module may use the proposed trajectory as one set of variables in the optimization model. In this case, the flow management module may search for a new trajectory that may be the closest in space and/or time to the proposed one.

Once an individual plan (e.g., one containing a four dimensional trajectory) is provided to an unmanned vehicle, a flow management module may track whether the unmanned vehicle may be properly executing the individual plan (e.g., following the four dimensional trajectory) or whether an unacceptable deviation in space and/or time may be observed. If an unacceptable deviation is observed, the flow management module may update the individual plan and provide the updated plan to the unmanned vehicle. FIG. 12 illustrates an example of such a process for monitoring and updating an individual plan.

The example process of FIG. 12 may start at operation 1202, where a flow management module may provide to a respective unmanned vehicle, such as a UAV, an individual plan containing a four dimensional trajectory to follow in a space, such as a controlled space. The flow management module may also define a buffer associated with the plan. The buffer may be defined around, for example, the four dimensional trajectory and may represent an acceptable deviation margin in space and/or time from the four dimensional trajectory. This buffer may be defined based on an analysis of historical data. The historical data may be associated with previously provided individual plans to unmanned vehicles of a similar type or a different type as the one of the UAV. These previous individual plans may also be associated with controls of the unmanned vehicles within the controlled space and/or other controlled spaces. The analysis may determine how well the unmanned vehicles executed the previously provided plans and, accordingly, generate acceptable or expected deviations or margins.

At operation 1204, the flow management module may monitor data associated with the unmanned vehicle. For example, various types of data about the UAV may be accessed from different sources. The data may be associated with the flow of the UAV within the controlled airspace. Various monitoring rates may be used. In an example, the monitoring may be continuous. In another example, the monitoring may be performed at time intervals or based on a triggered event (e.g., receiving state information indicating a fuel level falling below a threshold).

At operation 1206, the flow management module may monitor data associated with a plurality of unmanned vehicles and the space. Here again, various types of data about other UAVs and the controlled space may be accessed from different sources. The data may be associated with the flow of the UAVs within the controlled airspace. The data may also be associated with changes to the controlled airspace (e.g., changes to environmental data).

At operation 1208, the flow management module may determine whether to adjust the individual plan of the unmanned vehicle. If no adjustment is needed, the operation 1208 may be followed by the operation 1204 based on the monitoring rate. Otherwise, operation 1210 may be followed to adjust the individual plan.

The determination whether to adjust or not may be based on the monitored data. For example, the flow management module may detect a deviation between the provided four-dimensional trajectory and the actual four-dimensional trajectory followed by the UAV. The flow management module may compare the deviation to acceptable deviations as defined in the buffer. Based on the comparison, if an unacceptable deviation is detected, the flow management module may determine that an adjustment may be needed. In another example, the flow management module may determine that some of the data or assumptions regarding the UAV, the other UAV, and/or the space may have changed beyond a certain extent such that the adjustment may be needed. For instance, the flow management module may detect an unexpected change in the weather. Alternatively, the flow management module may detect an emergency arising from another UAV (e.g., an unexpected damage) that may impact (e.g., in time and/or space) the four dimensional trajectory of the UAV (e.g., may cause collision or update the priority). In both situations, the flow management module may determine that the adjustment may be warranted.

At operation 1210, the flow management module may adjust the individual plan and provide the adjusted plan to the unmanned vehicle. This operation may be followed by the operation 1204 based on the monitoring rate, such that the process of monitoring and adjusting, as needed, may be repeated over time.

Adjusting the individual plan may include updating the four dimensional trajectory with updated location and time data. The flow management module may generate this updated data based on the monitored data by, for example, following similar operations as the ones for generating the four dimensional trajectory.

Figure 13:
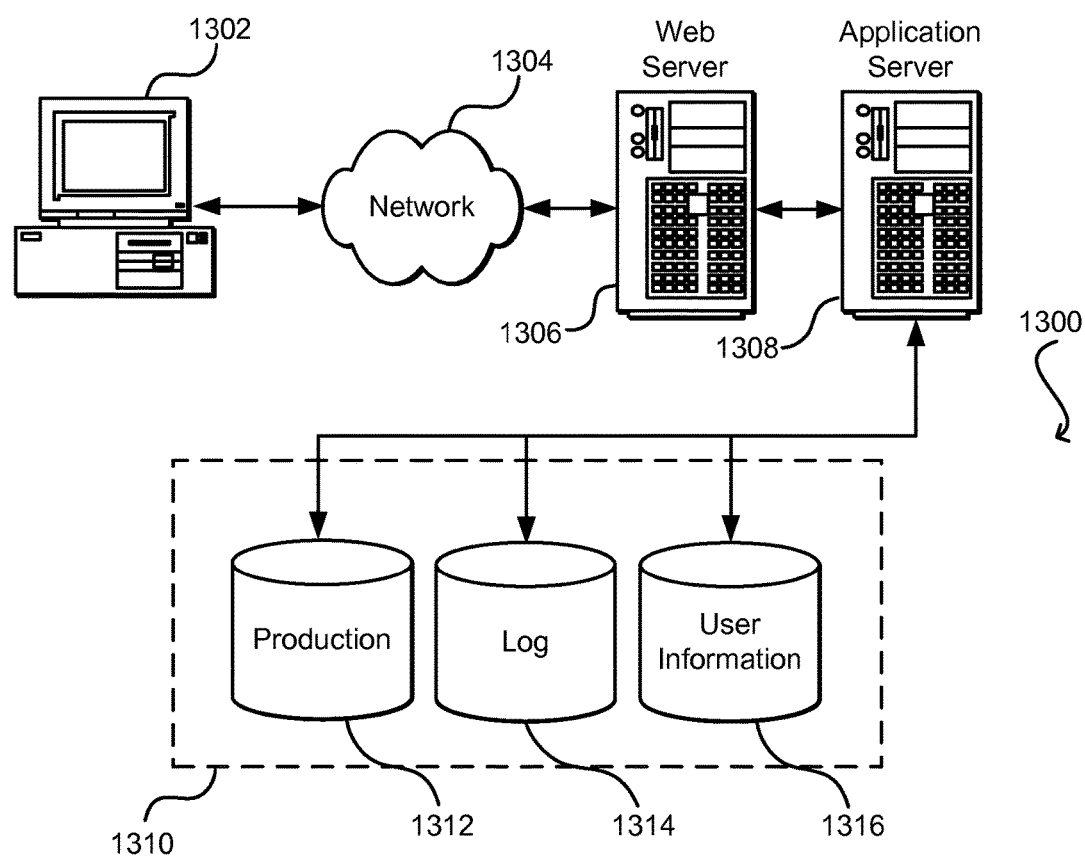
FIG. 13 illustrates an environment in which various embodiments may be implemented.

Turning to FIG. 13, the figure illustrates aspects of an example environment 1300 capable of implementing the above-described structures and functions. For example, the example environment 1300 may host a flow management module, such as the flow management module 110 described in connection with FIG. 1. As will be appreciated, although a Web-based environment is used for purposes of explanation, different environments may be used, as appropriate, to implement various embodiments. The environment includes an electronic client device 1302, which may include any appropriate device operable to send and receive requests, messages, or information over an appropriate network(s) 1304 and convey information back to a user of the device. Examples of such client devices include personal computers, cell phones, handheld messaging devices, laptop computers, set-top boxes, personal data assistants, electronic book readers, or any other computing device. The network(s) 1304 may include any appropriate network, including an intranet, the Internet, a cellular network, a local area network or any other such network or combination thereof. Components used for such a system may depend at least in part upon the type of network and/or environment selected. Protocols and components for communicating via such a network are well known and will not be discussed herein in detail. Communication over the network may be enabled by wired or wireless connections and combinations thereof. In this example, the network includes the Internet, and the environment includes a Web server 1306 for receiving requests and serving content in response thereto, although for other networks an alternative device serving a similar purpose could be used as would be apparent to one of ordinary skill in the art.

The illustrative environment includes at least one application server 1308 and a data store 1310. It should be understood that there may be several application servers, layers, or other elements, processes or components, which may be chained or otherwise configured, which may interact to perform tasks such as obtaining data from an appropriate data store. As used herein the term "data store" refers to any device or combination of devices capable of storing, accessing, and/or retrieving data, which may include any combination and number of data servers, databases, data storage devices and data storage media, in any standard, distributed or clustered environment. The application server may include any appropriate hardware and software for integrating with the data store as needed to execute aspects of one or more applications for the client device, handling a majority of the data access and business logic for an application. The application server 1308 provides access control services in cooperation with the data store 1310, and is able to generate content such as text, graphics, audio files and/or video files to be transferred to the user, which may be served to the user by the Web server in the form of HTML, XML or another appropriate structured language in this example. The handling of all requests and responses, as well as the delivery of content between the client device 1302 and the application server 1308, may be handled by the Web server 1306. It should be understood that the Web and application servers 1306 and 1308 are not required and are merely example components, as structured code discussed herein may be executed on any appropriate device or host machine as discussed elsewhere herein.

The data store 1310 may include several separate data tables, databases or other data storage mechanisms and media for storing data relating to a particular aspect. For example, the data store 1310 illustrated includes mechanisms for storing production data 1312 and user information 1316, which may be used to serve content for the production side. The data store 1310 is also shown to include a mechanism for storing log data 1314, which may be used for reporting, analysis, or other such purposes. It should be understood that there may be many other aspects that may need to be stored in the data store 1310, such as for page image information and to access correct information, which may be stored in any of the above listed mechanisms as appropriate or in additional mechanisms in the data store 1310. The data store 1310 is operable, through logic associated therewith, to receive instructions from the application server 1308 and obtain, update or otherwise process data in response thereto. In one example, a user might submit a search request for a certain type of item. In this case, the data store might access the user information to verify the identity of the user, and may access the catalog detail information to obtain information about items of that type. The information then may be returned to the user, such as in a results listing on a web page that the user is able to view via a browser on the client device 1302. Information for a particular item of interest may be viewed in a dedicated page or window of the browser.

Each server typically will include an operating system that provides executable program instructions for the general administration and operation of that server, and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 13. Thus, the depiction of environment 1300 in FIG. 13 should be taken as being illustrative in nature, and not limiting to the scope of the disclosure.

The various embodiments further may be implemented in a wide variety of operating environments, which in some cases may include one or more user computers, computing devices or processing devices which may be used to operate any of a number of applications. User or client devices may include any of a number of general purpose personal computers, such as desktop or laptop computers running a standard operating system, as well as cellular, wireless and handheld devices running mobile software and capable of supporting a number of networking and messaging protocols. Such a system also may include a number of workstations running any of a variety of commercially available operating systems and other known applications for purposes such as development and database management. These devices also may include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network may be, for example, a local area network, a wide-area network, a virtual private network, the Internet, an intranet, an extranet, a public switched telephone network, an infrared network, a wireless network, and any combination thereof.

In embodiments utilizing a Web server, the Web server may run any of a variety of server or mid-tier applications, including HTTP servers, FTP servers, CGI servers, data servers, Java servers, and business application servers. The server(s) may also be capable of executing programs or scripts in response to requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase®, and IBM®.

The environment may include a variety of data stores and other memory and storage media as discussed above. These may reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device may include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also may include a computer-readable storage media reader, a communications device (e.g., a modem, a network card (wireless or wired), an infrared communication device, etc.) and working memory as described above. The computer-readable storage media reader may be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer-readable media for containing code, or portions of code, may include any appropriate media known or used in the art, including storage media and communication media, such as but not limited to volatile and non-volatile, removable and non-removable media implemented in any method or technology for storage and/or transmission of information such as computer-readable instructions, data structures, program modules or other data, including RAM, ROM, EEPROM, flash memory or other memory technology, CD-ROM, DVD, or other optical storage, magnetic cassettes, magnetic tape, magnetic disk storage or other magnetic storage devices or any other medium which may be used to store the desired information and which may be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as that included in the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z in order for each to be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   detecting, by a computer system associated with a facility, an unmanned aerial vehicle (UAV) is located within a controlled airspace of the facility, the controlled airspace having an outer boundary defined around at least a portion of the facility and associated with at least one of a UAV throughput within the controlled airspace or a UAV energy usage within the controlled airspace, the UAV configured to perform an autonomous operation within the controlled airspace;
   computing, by the computer system, a four dimensional trajectory for the UAV to follow within the controlled airspace, the four dimensional trajectory specifying three dimensional spatial points within the controlled airspace and time points corresponding to the three dimensional spatial points, the computing based at least in part on data associated with the UAV, data associated with a plurality of other UAVs located within the controlled airspace, data associated with an environment of the controlled airspace, the UAV throughput and the UAV energy usage, the data associated with the UAV at least identifying a mission of the UAV, the mission comprising a portion outside of the outer boundary of the controlled airspace and being different from another mission of another UAV of the plurality of UAVs; and
   causing, by the computer system, the UAV to autonomously follow the three dimensional spatial points according to the time points based at least in part on providing the four dimensional trajectory to the UAV.

2. The computer-implemented method of claim 1, wherein the UAV is configured to deliver an item offered from an electronic marketplace associated with the facility.

3. The computer-implemented method of claim 1, wherein detecting that the UAV is located within the controlled airspace comprises determining whether the mission of the UAV comprises approaching the facility for autonomous landing or moving away from the facility for autonomous launching, and wherein data used to compute the four dimensional trajectory changes based at least in part on the determining.

4. The computer-implemented method of claim 1, further comprising:
   upon the detecting, causing the UAV to move to a queuing area of the controlled airspace until receiving the four dimensional trajectory, wherein the queuing area is located between the outer boundary and a second boundary of the controller airspace, and wherein causing the UAV to autonomously follow the three dimensional spatial points comprises at least one of:
   instructing the UAV to start a landing maneuver by at least crossing the second boundary from the queuing area, wherein the landing maneuver is based at least in part on the four dimensional trajectory between the second boundary and a surface area within the controlled airspace, or
   instructing the UAV to start a departure maneuver by at least crossing the outer boundary from the queuing area, wherein the departure maneuver is based at least in part on the four dimensional trajectory between the queuing area and the outer boundary of the controlled airspace.

5. One or more non-transitory computer-readable media comprising instructions that, when executed on one or more computing devices, cause the one or more computing devices to at least:
   determine that an unmanned vehicle is located within a space that is associated with a metric, the space defined based at least in part on a boundary around at least a portion of a facility, the metric based at least in part on efficiency of a flow of a plurality of unmanned vehicles located within the space;
   compute pairs of location data and time data that represent a path for the unmanned vehicle to use within the space, the pairs of location data and time data computed based at least in part on data associated with the unmanned vehicle, data associated with another unmanned vehicle located within the space, and the metric associated with the space, the data associated with the unmanned vehicle at least identifying a mission of the unmanned vehicle, the mission comprising a portion outside of the boundary of the space and being different from another mission of the other unmanned vehicle; and
   provide the pairs of location data and time data to the unmanned vehicle.

6. The one or more computer-readable media of claim 5, wherein the unmanned vehicle is configured to perform an autonomous aerial maneuver within the space, and wherein the space comprises a controlled space around a facility.

7. The one or more computer-readable media of claim 5, wherein the pairs of location data and time data are computed in response to a proposed path that is received from the unmanned vehicle over a local area network.

8. The one or more computer-readable media of claim 7, wherein instructions that, when executed on the one or more computing devices, cause the one or more computing devices to:
evaluate the proposed path of the unmanned vehicle based at least in part on the data associated with the unmanned vehicle, the data associated with the other unmanned vehicle, and the metric associated with the space;
deny the proposed path based at least in part on the evaluate; and
respond with the pairs of location data and time data based at least in part on the denial.

9. The one or more computer-readable media of claim 5, wherein computing the pairs of location data and time data based at least in part on the metric comprises one or more of: increasing a number of a plurality of unmanned vehicles arriving or leaving the space, reducing energy consumption of the plurality of unmanned vehicles while in the space, reducing time spent by the plurality of unmanned vehicles in the space, or reducing distances separating the plurality of unmanned vehicles within the space.

10. The one or more computer-readable media of claim 5, wherein the data associated with the unmanned vehicle comprises an operational state of the unmanned vehicle, and wherein instructions that, when executed on the one or more computing devices, cause the one or more computing devices to:
assign a priority to the unmanned vehicle for flowing through the space based at least in part on the operational state;
determine that the path of the unmanned vehicle intersects with a corresponding path of the other unmanned vehicle; and
update the corresponding path of the other unmanned vehicle based at least in part on the intersecting between the path and the corresponding path and based at least in part on the priority of the unmanned vehicle being higher than a priority of the other unmanned vehicle.

11. The one or more computer-readable media of claim 5, wherein the data associated with the unmanned vehicle comprises at least one of: a state of the unmanned vehicle, a capability of the unmanned vehicle, a current location of the unmanned vehicle, or a schedule of the unmanned vehicle.

12. The one or more computer-readable media of claim 5, wherein the pairs of location data and time data are further computed based at least in part on environmental data associated with the space, wherein the environmental data indicates at least one of: an obstacle located in the space, a current weather condition of the space, or separations between a plurality of unmanned aerial vehicles located within the space.

13. A system comprising:
a plurality of unmanned vehicles; and
a management component configured to manage a flow of the plurality of unmanned vehicles within a space associated with a metric, the space defined based at least in part on a boundary around at least a portion of a facility, the metric based at least in part on the flow of the unmanned vehicle within the space; the management component comprising:
one or more processors; and
one or more non-transitory computer-readable media comprising instructions that, when executed with the one or more processors, cause the management component to at least:
determine that an unmanned vehicle is located within the space;
generate a path for the unmanned vehicle to follow within the space, the path defined based at least in part on pairs of location data and time data, the location data and the time data generated based at least in part on data associated with the unmanned vehicle, data associated with another unmanned vehicle located within the space, and the metric associated with the space, the data associated with the unmanned vehicle at least identifying a mission of the unmanned vehicle, the mission comprising a portion outside of the boundary of the space and being different from another mission of the other unmanned vehicle; and
provide data about the path to the unmanned vehicle.

14. The system of claim 13, wherein the data associated with the unmanned vehicle comprises a capability of the unmanned vehicle, and wherein the path comprises a maneuver for the unmanned vehicle to autonomously perform based at least in part on the capability of the unmanned vehicle.

15. The system of claim 13, wherein the pairs of location data and time data further define a buffer around the path based at least in part on historical data associated with followed paths within the space by the plurality of unmanned vehicles, wherein the buffer sets a limits to a deviation of the unmanned vehicle from the path, and wherein the buffer excludes a path of the other unmanned vehicle.

16. The system of claim 15, wherein the provided data causes the unmanned vehicle to follow the path, and wherein the instructions, when executed by the processor, cause the system to at least:
monitor whether the unmanned vehicle deviates from the path based at least in part on the buffer;
generate additional pairs of location data and time data based at least in part on the unmanned vehicle deviating from the path; and
provide the additional pairs of location data and time data to the unmanned vehicle causing the unmanned vehicle to adjust the followed path.

17. The system of claim 13, wherein the data associated with the unmanned vehicle comprises a location of the unmanned vehicle within the space, and wherein the location is received from at least a sensor separate from the unmanned vehicle.

18. The system of claim 13, wherein determining that the unmanned vehicle is located within the space comprises receiving, from the unmanned vehicle, an identifier of the unmanned vehicle over a local area network deployed in association with the space.

19. The system of claim 13, wherein the data associated with the unmanned vehicle comprises an identifier and a state of the unmanned vehicle, wherein the identifier and the state are received from the unmanned vehicle, and wherein generating the path comprises:
identifying a capability of the unmanned vehicle based at least in part on using the identifier to access information about the capability that is stored by the system; and assigning a priority to the unmanned vehicle based at least in part on the state; and generate the path based at least in part on the capability and the priority relative to a capability and priority of the other unmanned vehicle in the space.

20. The system of claim 13, wherein the system is associated with a plurality of facilities associated with respective controlled spaces, wherein each facility comprises storage space from which items are available for deliveries to end destination, wherein unmanned vehicles are deployed for the deliveries of the items from the facilities to the end destinations, and wherein the system is configured to remotely manage throughput of unmanned vehicles within the controlled spaces at the respective facilities.

* * * * *